(12) United States Patent
Miyasaka

(10) Patent No.: US 11,982,987 B2
(45) Date of Patent: May 14, 2024

(54) PROGRAMMABLE LOGIC CONTROLLER AND ANALYZER

(71) Applicant: Keyence Corporation, Osaka (JP)

(72) Inventor: Tetsuya Miyasaka, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 682 days.

(21) Appl. No.: 17/126,209

(22) Filed: Dec. 18, 2020

(65) Prior Publication Data

US 2021/0240154 A1 Aug. 5, 2021

(30) Foreign Application Priority Data

Jan. 31, 2020 (JP) .................. 2020-014970
Sep. 28, 2020 (JP) .................. 2020-161926

(51) Int. Cl.
*G05B 19/05* (2006.01)
*G06F 18/2413* (2023.01)

(52) U.S. Cl.
CPC ......... *G05B 19/058* (2013.01); *G05B 19/056* (2013.01); *G06F 18/2413* (2023.01); *G05B 2219/14107* (2013.01)

(58) Field of Classification Search
CPC .... G05B 19/058; G05B 19/05; G05B 19/056; G05B 2219/14107; G05B 23/0221; G05B 23/024; G05B 23/0264; G05B 19/4183; G05B 19/0426; G05B 23/0283; G05B 19/0405; G05B 23/0235; G06F 18/2413;

(Continued)

(56) References Cited

U.S. PATENT DOCUMENTS

2019/0018385 A1   1/2019  Soneda et al.
2019/0278247 A1*  9/2019  Abe ................. G05B 19/41885

(Continued)

FOREIGN PATENT DOCUMENTS

DE   102018100424 A1 *  7/2019
JP         5661222 B1    12/2014

(Continued)

OTHER PUBLICATIONS

U.S. Appl. No. 17/012,104, filed Sep. 4, 2020 (125 pages).

(Continued)

*Primary Examiner* — Lisa M Caputo
*Assistant Examiner* — Eric Sebastian Von Wald
(74) *Attorney, Agent, or Firm* — Kilyk & Bowersox, P.L.L.C.

(57) ABSTRACT

An object of the present invention is to efficiently identify an abnormal device by analyzing and classifying characteristics such as periodicity and continuity of data related to each device. A programmable logic controller collects data held by a device as a collection target out of the plurality of devices in accordance with a predetermined collection setting for each scan cycle of the user program, classifies each of the devices into one of a plurality of types on the basis of a characteristic of the collected time-series data of each of the devices, and determines a detection algorithm used in identification of the device as an abnormal device in accordance with the time-series data of the device collected by the collection section and the type of the device classified by the classification section for each of the devices.

20 Claims, 22 Drawing Sheets

(58) Field of Classification Search
CPC .... G06F 18/21; G06F 18/241; G06F 18/2113; G06F 18/213; G06F 18/214; G06F 18/2431; G06F 2218/12; G06N 20/00; G06Q 10/0637; G06T 2207/10004; G06T 2207/30164; G06T 7/0004; G06T 2207/10016; G06T 7/0006; Y02P 90/02

See application file for complete search history.

(56) References Cited

U.S. PATENT DOCUMENTS

| | | | |
|---|---|---|---|
| 2019/0286096 A1* | 9/2019 | Kawanoue | G05B 23/0254 |
| 2019/0294137 A1* | 9/2019 | Kawanoue | G05B 19/05 |
| 2019/0301979 A1* | 10/2019 | Kawanoue | G05B 23/0254 |
| 2020/0125060 A1 | 4/2020 | Fujimura | |
| 2020/0125061 A1 | 4/2020 | Miyasaka | |
| 2020/0259998 A1 | 8/2020 | Tsujikawa | |
| 2022/0004177 A1* | 1/2022 | Kurokawa | G05B 23/024 |

FOREIGN PATENT DOCUMENTS

| | | | |
|---|---|---|---|
| JP | 201897662 A | 6/2018 | |
| JP | 2018180759 A | 11/2018 | |
| JP | 2019159697 A | 9/2019 | |

OTHER PUBLICATIONS

U.S. Appl. No. 17/012,112, filed Sep. 4, 2020 (99 pages).
Office Action issued in corresponding Japanese Patent Application 2020-161926 mailed Mar. 15, 2024 (with English translation) ( 7 pages).

* cited by examiner

| COLLECTION COUNT | TIMER | Dev0 | Dev1 | Dev10 |
|---|---|---|---|---|
| 511 | 43252 | 0x0016 | 0x0010 | 0x0012 |
| 512 | 43350 | 0x0013 | 0x0010 | 0x001F |
| 513 | 43460 | 0x0015 | 0x0010 | 0x0025 |
| 514 | 43555 | 0x0011 | 0x0010 | 0x002E |
| 515 | 43653 | 0x0018 | 0x0010 | 0x0034 |

91

| SCAN NUMBER | COUNTER | RL1 | RL2 | RL3 | RL4 |
|---|---|---|---|---|---|
| 0 | 240 | ON | OFF | ON | OFF |
| 1 | 350 | ON | OFF | OFF | OFF |
| 2 | 450 | ON | OFF | OFF | OFF |
| 3 | 560 | OFF | OFF | OFF | OFF |
| 4 | 662 | OFF | OFF | OFF | OFF |
| 5 | 770 | OFF | ON | OFF | OFF |
| 6 | 875 | OFF | ON | OFF | OFF |

92a

COMPRESS

| SCAN NUMBER | COUNTER | RL1 | RL2 | RL3 | RL4 |
|---|---|---|---|---|---|
| 0 | 240 | ON | OFF | ON | OFF |
| 1 | 350 | ON | OFF | OFF | OFF |
| 3 | 560 | OFF | OFF | OFF | OFF |
| 5 | 770 | OFF | ON | OFF | OFF |

| TYPE | VALUE RANGE |
|---|---|
| BIT | 0, 1 |
| 1-WORD UNSIGNED INTEGER | 0~65535 |
| 1-WORD SIGNED INTEGER | −32768~32767 |
| 2-WORD UNSIGNED INTEGER | 0~4294967295 |
| 2-WORD SIGNED INTEGER | −214783648~2147483647 |
| FLOATING-POINT NUMBER | 2.225074e−308~1.797693e+30 |

PROGRAMMABLE LOGIC CONTROLLER AND ANALYZER

CROSS-REFERENCE TO RELATED APPLICATIONS

The present application claims foreign priority based on Japanese Patent Application No. 2020-014970, filed Jan. 31, 2020, and No. 2020-161926 filed Sep. 28, 2020, the contents of which are incorporated herein by references.

BACKGROUND OF THE INVENTION

1. Field of the Invention

The present invention relates to a programmable logic controller and an analyzer.

2. Description of Related Art

A programmable logic controller (PLC) is a controller that controls industrial machines, such as manufacturing equipment, a transport apparatus, and an inspection apparatus, in factory automation (Japanese Patent No. 5661222, Japanese Unexamined Patent Publication No. 2018-097662).

The PLC executes a user program, such as a ladder program, created by a programmer to control various extension units, controlled equipment, and the like.

In order to monitor the operation of the PLC and the operation of the industrial machine controlled by the PLC, it is desired to collect and utilize data held by the PLC. The PLC has a basic unit (central processing unit (CPU) unit) and an extension unit connected thereto. The basic unit executes a user program such as a ladder program to control the extension unit. The extension unit controls the industrial machine in accordance with a command from the basic unit and returns the control result to the basic unit.

These pieces of data, such as the control results, are used for trouble analysis and quality control. Hence it is required to accumulate and analyze these pieces of data and to obtain analysis results at an early stage for restoration. However, in the case of recording the data of each of all devices related to the PLC, an enormous amount of data is stored, and further, it is necessary to analyze such an enormous amount of data (all devices) in order to identify an abnormal device, which requires a time-consuming work. Conventionally, a specific device has been analyzed as an analysis target to automatically determine an abnormality, and for an analysis method to be used, an analysis method suitable for data has been prepared in advance to perform the determination. Experience and knowledge are also required to select a specific device or to determine an analysis method. Therefore, a mechanism is required for, in addition to suitably storing a large amount of data, efficiently identifying an abnormal device from a large amount of data related to each device without requiring sufficient expert knowledge or experience.

SUMMARY OF THE INVENTION

In view of the above problems, it is an object of the present invention to efficiently identify an abnormal device by analyzing and classifying characteristics such as periodicity and continuity of data related to each device.

The present invention is, for example, a programmable logic controller, including: an execution engine that repeatedly executes a user program; a device memory having a plurality of devices that are storage areas for storing data accessed by the execution engine in accordance with the user program; a collection section for collecting data held by a device as a collection target out of the plurality of devices in accordance with a predetermined collection setting for each execution cycle of the user program; a classification section for classifying each of the devices into one of a plurality of types on the basis of a characteristic of time-series data of each of the devices collected by the collection section; a determination section for determining a detection algorithm used in identification of the device as an abnormal device in accordance with the time-series data of the device collected by the collection section and the type of the device classified by the classification section for each of the devices; and an identification section for identifying an abnormal device by analyzing the time-series data of the device collected by the collection section by using the detection algorithm determined by the determination section for the device in accordance with the type of the device classified by the classification section.

Further, the present invention is, for example, an analyzer communicatively connected to a programmable logic controller that includes an execution engine that repeatedly executes a user program, a device memory having a plurality of devices that are storage areas for storing data accessed by the execution engine in accordance with the user program, and a collection section for collecting data held by a device as a collection target out of the plurality of devices in accordance with a predetermined collection setting for each scan cycle of the user program. The analyzer includes: an acquisition section for acquiring time-series data of each of the devices collected by the collection section from the programmable logic controller; a classification section for classifying each of the devices into any of a plurality of types on the basis of a characteristic of time-series data of each of the devices acquired by the collection section; a determination section for determining a detection algorithm used in identification of the device as an abnormal device in accordance with the time-series data of the device collected by the collection section and the type of the device classified by the classification section for each of the devices; an identification section for identifying an abnormal device by analyzing the time-series data of the device collected by the collection section by using the detection algorithm determined by the determination section for the device in accordance with the type of the device classified by the classification section; and an output section for outputting the identification result identified by the identification section.

According to the present invention, it is possible to efficiently identify an abnormal device by analyzing and classifying characteristics such as periodicity and continuity of data related to each device.

BRIEF DESCRIPTION OF THE DRAWINGS

FIG. 14 is a diagram showing types of data

DETAILED DESCRIPTION OF PREFERRED EMBODIMENTS

Figure 1:
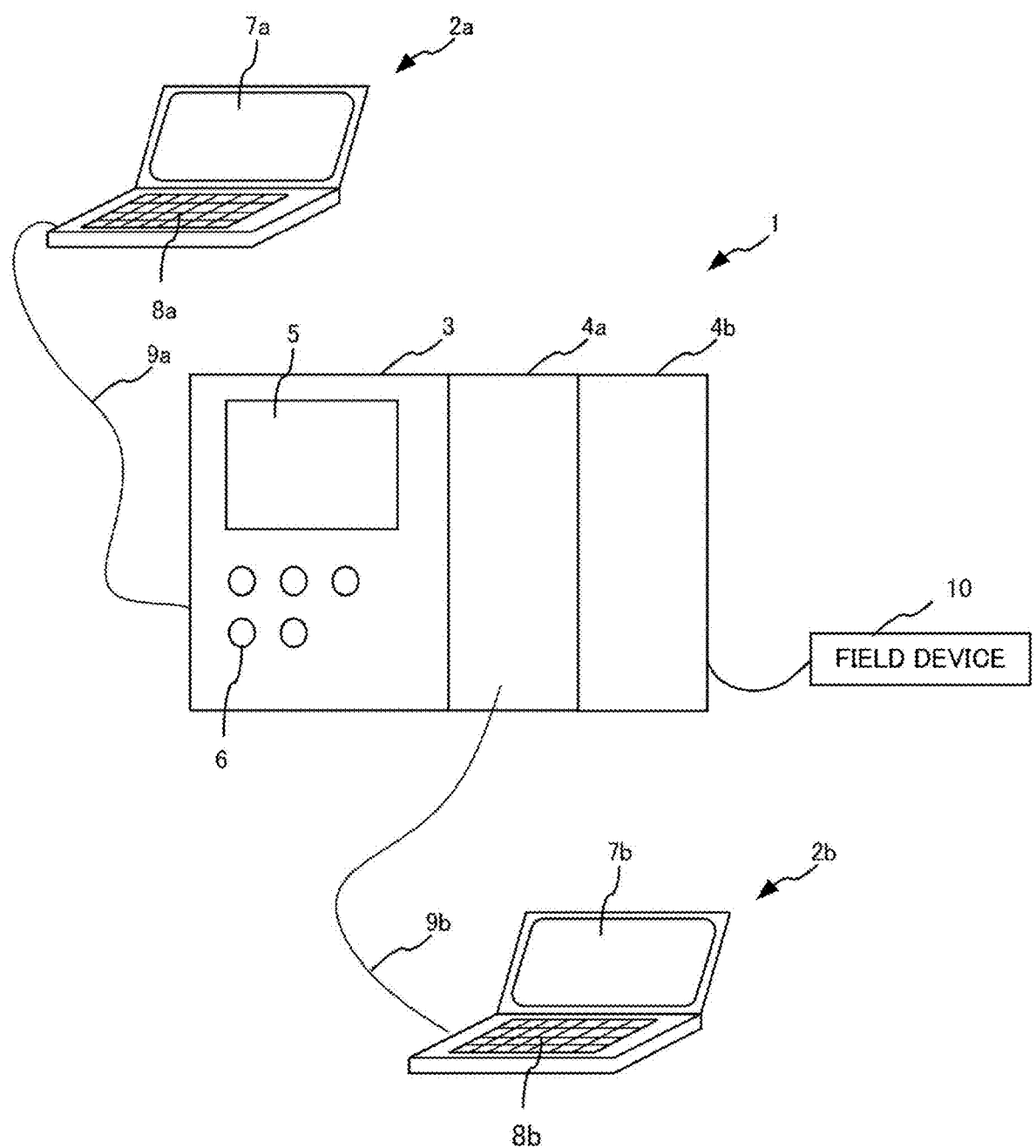
FIG. 1 is a view showing a PLC system.

Hereinafter, embodiments will be described in detail with reference to the accompanying drawings. The following embodiments are not intended to limit the invention according to the claims, and not all combinations of characteristics described in the embodiments are essential to the invention. Two or more characteristics out of a plurality of characteristics described in the embodiments may be combined optionally. In addition, the same or similar components are given the same reference numerals, and the duplicated description is omitted. A lowercase alphabetic character may be added to the end of the reference signs indicating the same or similar elements. When matters common to a plurality of elements are described, the lowercase alphabets are omitted.

First Embodiment

<System Configuration>

A first embodiment of the present invention will be described below. First, in order to enable a person skilled in the art to better understand a programmable logic controller (PLC, which may simply be referred to as a programmable controller), the configuration of a general PLC and the operation thereof will be described.

FIG. 1 is a conceptual diagram showing a configuration example of a programmable logic controller system according to an embodiment of the present invention. As shown in FIG. 1, the system includes a PC 2a configured to edit a user program such as a ladder program, and a programmable logic controller (PLC) 1 configured to integrally control various control apparatuses installed in a factory or the like. PC is an abbreviation of personal computer. The user program may be created using a graphical programming language such as a ladder language or a motion program in a flowchart form such as a sequential function chart (SFC) or may be created using a high-level programming language such as C language. In the following, the user program is a ladder program for the convenience of description. The PLC 1 includes a basic unit 3 incorporating a CPU and one or a plurality of extension units 4. One or the plurality of extension units 4 can be attached to and detached from the basic unit 3.

The basic unit (also referred to as CPU unit) 3 includes a display part 5 and an operation part 6. The display part 5 can display an operation state or the like of each extension unit 4 attached to the basic unit 3. The display part 5 switches the display content according to the operation content of the operation part 6. The display part 5 normally displays a current value (device value) of a device in the PLC 1 and error information generated in the PLC 1. Here, the device includes various devices (relay, timer, counter, etc.) included in the basic unit 3 and the extension unit 4, refers to an area on a memory provided for storing a device value (device data), and may be referred to as a device memory. Note that the device memory is a non-volatile memory and may be made of a rewritable non-volatile ROM, and non-volatility may be achieved by battery backup or the like of a non-volatile RAM or the like. ROM is an abbreviation of read-only memory. RAM is an abbreviation of random-access memory. The device value is information indicating an input state from input equipment, an output state to output equipment, and states of an internal relay (auxiliary relay) set on the user program, a timer, a counter, a data memory, and the like. The types of device values are a bit type, a word type, and the like. The bit device stores a 1-bit device value, for example, 0/1, ON/OFF, H/L, and the like. The word device stores a device value of one word. As the collection target of the data utilization program described in detail below, a variable may be designated as a device. The variable is also a holding section for holding information and is accessed by the execution engine in accordance with the user program. Thus, in the following description, a device also refers to a variable. Note that a memory holding a device may be referred to as a device memory. A memory holding collected data may be referred to as a data memory.

The extension unit 4 is prepared for extending the function of the PLC 1. To each extension unit 4, a field device (controlled apparatus) 10 corresponding to the function of the extension unit 4 may be connected, whereby each field device 10 is connected to the basic unit 3 via the extension unit 4. The field device 10 may be input equipment such as a sensor or a camera, or output equipment such as an actuator. A plurality of field devices may be connected to one extension unit 4.

For example, an extension unit 4b may be a positioning unit that drives a motor (field device 10) to position a workpiece or may be a counter unit. The counter unit counts signals from an encoder (field device 10) such as a manual pulser.

An extension unit 4a, for example, is a data utilization unit that collects data to be collected from the basic unit 3 and the extension unit 4b, executes a user program (data utilization program), such as a flow, to perform data processing on the data to be collected and create data to be displayed, and creates display data (source data) for displaying a dashboard on a display part 7 or a PC 2. In the present embodiment, an example in which the extension unit 4a collects data of each device will be described, but the collection part may be provided in the basic unit 3 or in another extension unit. The extension unit 4a can also function as an analyzer that analyzes the collected data in accordance with an instruction from the basic unit 3 and a predetermined timing. In the present embodiment, an example in which the extension unit 4a operates as the analyzer will be described, but the present invention is not intended to be limited, and the basic unit 3 may function as the analyzer, and external apparatuses such as the PCs 2a, 2b may function as the analyzer. The flow (flow program) described below is only an example of the data utilization program. The basic unit 3 is sometimes referred to as a CPU unit. Note that the system including the PLC 1 and the PC 2 may be referred to as a programmable logic controller system.

The PC 2a is a computer that is operated mainly by a programmer. On the other hand, the PC 2b is a computer mainly operated by a person in charge in the field. The PC 2a may be referred to as a program creation support apparatus (setting apparatus). The PC 2 is, for example, a portable notebook type or tablet-type personal computer or smart phone and is an external computer including the display part 7 and an operation part 8. The external computer is a computer located outside the PLC 1. A ladder program, which is an example of a user program for controlling the PLC 1, is created using the PC 2a. The created ladder program is converted into a mnemonic code in the PC 2a. The PC 2 is connected to the basic unit 3 of the PLC 1 via a communication cable 9 such as a universal serial bus (USB) cable. For example, the PC 2a sends the ladder program converted into a mnemonic code to the basic unit 3. The basic unit 3 converts the ladder program into a machine code and stores the machine code into a memory provided in the basic unit 3. Here, the mnemonic code is transmitted to the basic unit 3, but the present invention is not limited thereto. For example, the PC 2a may convert the mnemonic code into an intermediate code and transmit the intermediate code to the basic unit 3.

Although not shown in FIG. 1, the operation part 8 of the PC 2 may include a pointing device such as a mouse connected to the PC 2. The PC 2 may be configured to be detachably connected to the basic unit 3 of the PLC 1 via another communication cable 9 except for the USB cable. Further, the PC 2 may be connected to the basic unit 3 of the PLC 1 by wireless communication without the communication cable 9.

<Program Creation Support Apparatus>

Figure 2:
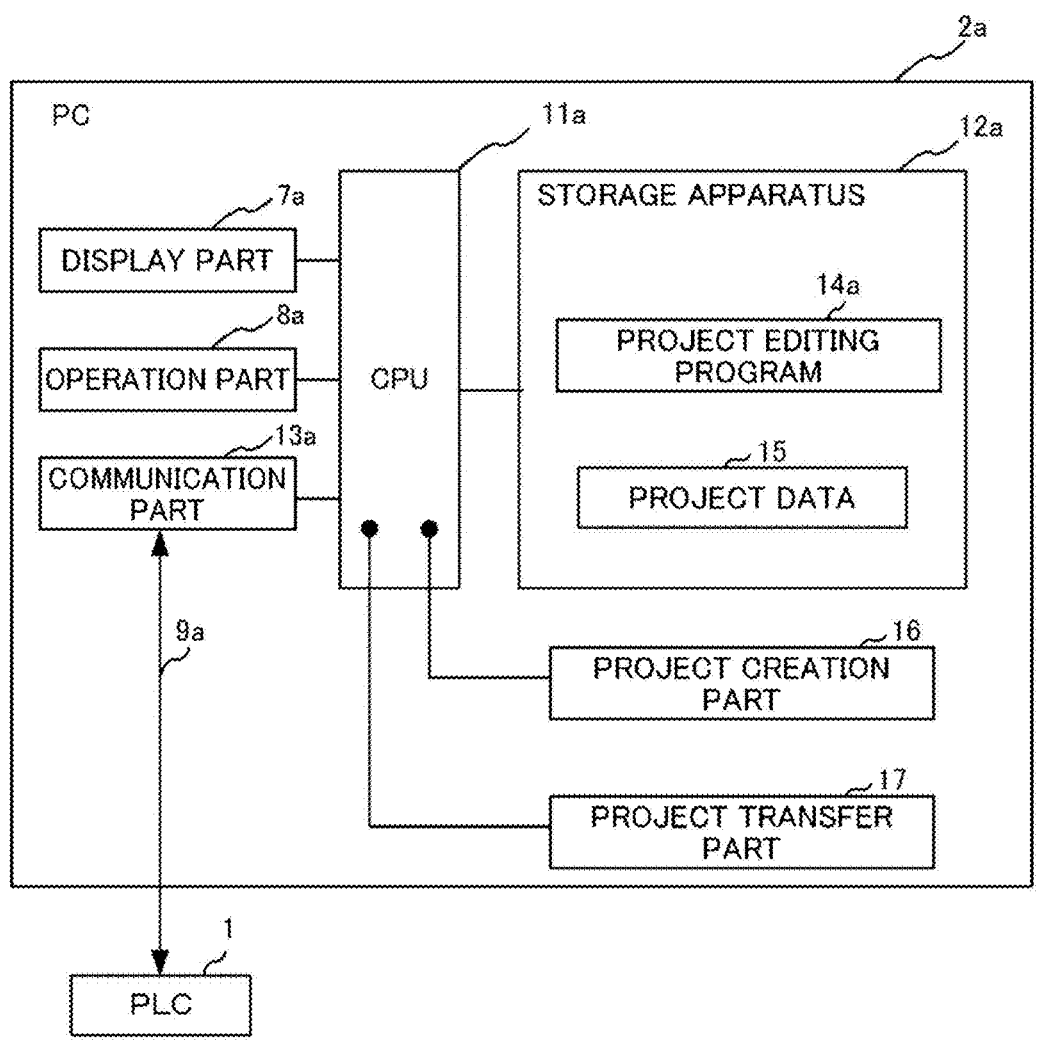
FIG. 2 is a diagram for explaining a personal computer (PC)

FIG. 2 is a block diagram for explaining the electrical configuration of the PC 2a. As shown in FIG. 2, the PC 2a includes a CPU 11a, a display part 7a, an operation part 8a, a storage apparatus 12a, and a communication part 13a. The display part 7a, the operation part 8a, the storage apparatus 12a, and the communication part 13a are each connected electrically to the CPU 11a. The storage apparatus 12a includes a RAM, a ROM, an HDD, and an SSD and may further include a removable memory card. CPU is an abbreviation of central processing unit. HDD is an abbreviation of hard disk drive. SSD is an abbreviation of solid-state drive.

A user of the PC 2a causes the CPU 11a to execute a project editing program 14a stored in the storage apparatus 12a and edits project data 15 through the operation part 8a. When the CPU 11a executes the project editing program 14a, a project creation part 16 and a project transfer part 17 are achieved. The project creation part 16 creates the project data 15 in accordance with input by a user. The project transfer part 17 transfers the project data 15 to the PLC 1. The project data 15 includes one or more user programs (examples: ladder program, control program, motion program, data utilization program), configuration information of each of the basic unit 3 and the extension unit 4, and setting information of an identification function provided in each of the basic unit 3 and the extension unit 4. The configuration information includes connection positions of the plurality of extension units 4 to the basic unit 3 and allocation information of devices. The configuration information may include information indicating a function (examples: data collection function, communication function, positioning function) provided in the basic unit 3 and information indicating a function (examples: communication function, positioning function, and shooting function) of the extension unit 4. The setting information of the identification function includes setting information relating to a function provided in the basic unit 3 (examples: data collection function, communication function, positioning function), for example, in the case of the data collection function, setting information of a data collection condition and a data collection target, and includes setting information relating to a function of the extension unit 4 (examples: communication function, positioning function, data utilization function, shooting function), and the like. The editing of the project data 15 includes the creation and change (reediting) of the project data 15. The user can read the project data 15 stored in the storage apparatus 12a as needed and change the project data 15 by using the project editing program 14a. The communication part 13a communicates with the basic unit 3 via a communication cable 9a. The project transfer part 17 transfers the project data to the basic unit 3 via the communication part 13a. The communication part 13a communicates with the extension unit 4a via a communication cable 9b.

<PC Used to Display Dashboard>

Figure 3:
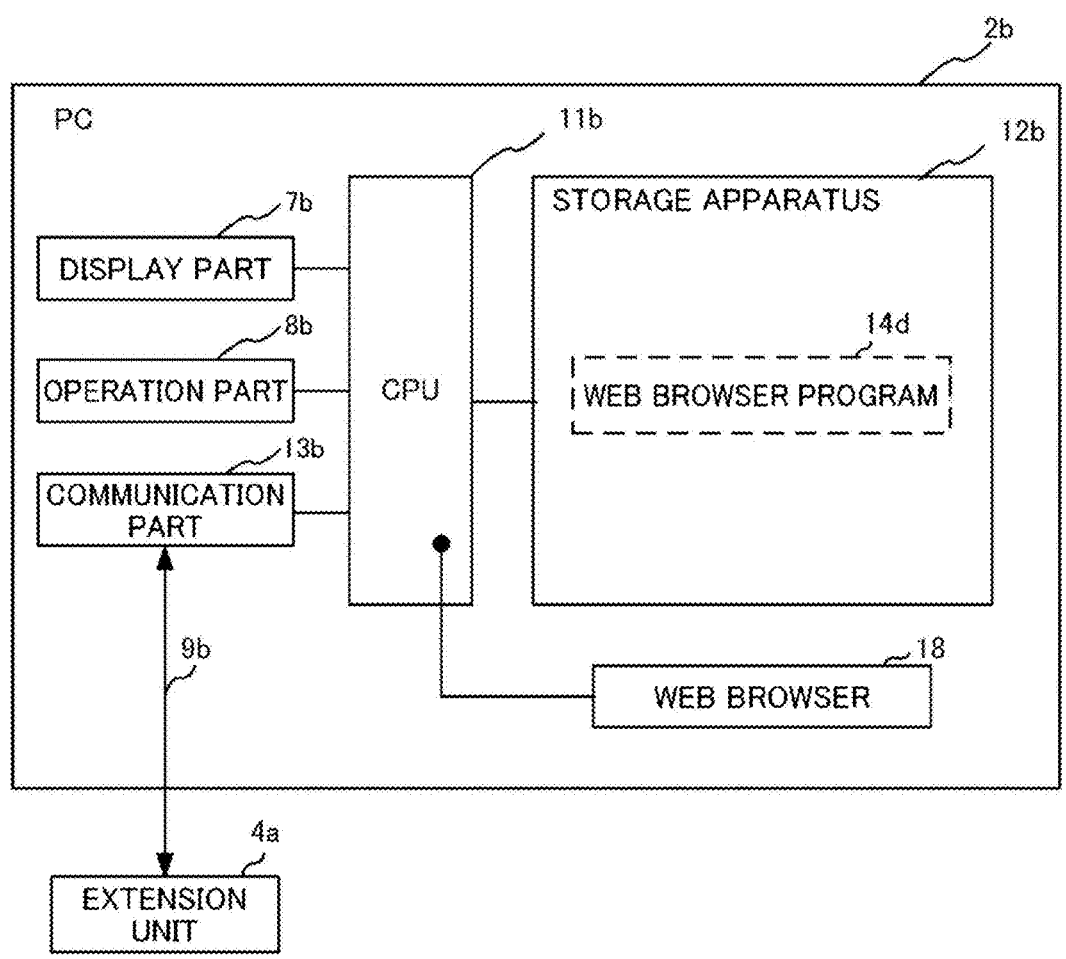
FIG. 3 is a diagram for explaining a PC.

FIG. 3 is a block diagram for explaining the electrical configuration of the PC 2b. As shown in FIG. 3, the PC 2b includes a CPU 11b, a display part 7b, an operation part 8b, a storage apparatus 12b, and a communication part 13b. The display part 7b, the operation part 8b, the storage apparatus 12b, and the communication part 13b are each connected electrically to the CPU 11b. The storage apparatus 12b includes a RAM, a ROM, an HDD, an SSD and may further include a removable memory card.

The CPU 11b executes a web browser program 14d to achieve a web browser 18. The web browser 18 accesses, via the communication part 13b, a setting page of a data utilization application provided by the extension unit 4a or a page of a dashboard. Further, the CPU 11b displays an identification result (determination result) at the time of occurrence of an abnormality on the display part 7b in accordance with screen information indicating the identification result transmitted from the extension unit 4a.

<PLC>

Figure 4:
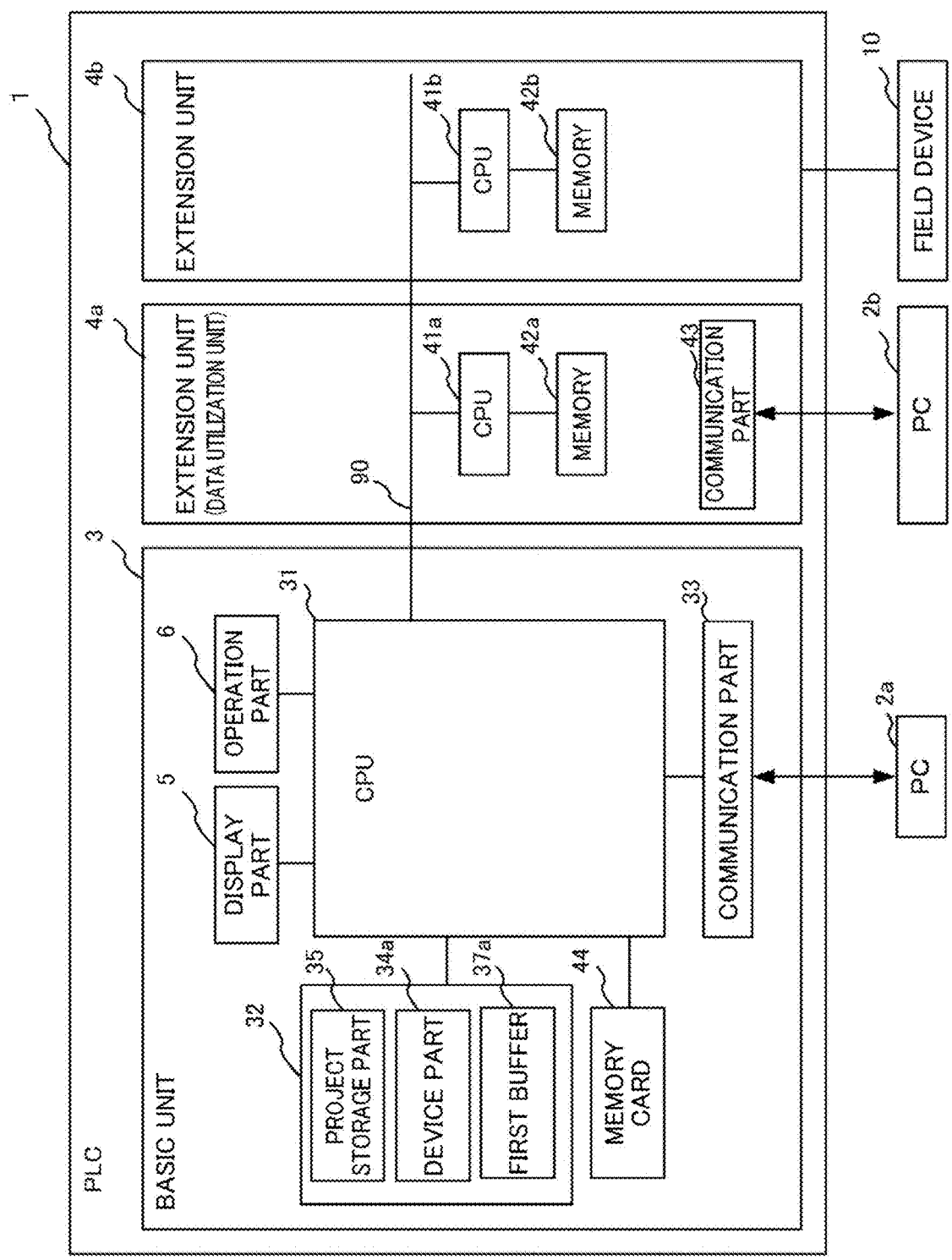
FIG. 4 is a diagram for explaining a PLC.

FIG. 4 is a block diagram for explaining the electrical configuration of the PLC 1. As shown in FIG. 4, the basic unit 3 includes a CPU 31, the display part 5, the operation part 6, a storage apparatus 32, a communication part 33, and a memory card 44. The display part 5, the operation part 6, the storage apparatus 32, and the communication part 33 are each connected electrically to the CPU 31. The storage apparatus 32 may include a RAM or a ROM. The storage apparatus 32 has a plurality of storage areas such as a device part 34, a project storage part 35, and a first buffer 37a. The device part 34 has a bit device, a word device, and the like, and each device stores a device value, which corresponds to a device memory. The project storage part 35 stores the project data input from the PC 2a. The first buffer 37a stores a device value (time-series data) to be collected from the device part 34 for each scan cycle. Details of the first buffer will be described later with reference to FIG. 5. When a saving condition is satisfied, the memory card 44 stores time-series data that is control data from each device stored in the first buffer 37a. By temporarily holding the time-series data in the memory card 44, for example, the data of the classification target or the identification target can be verified later by an external apparatus or the like, and the important latest data can be held as log information. Further, in the present invention, since pieces of data of all devices related to the PLC 1 are collected basically, the collected data is enormous, and an effect of reducing a processing load can be expected by holding the data to be processed in a separate memory, and further, it is possible to facilitate executing collection processing and processing relating to collected data (classification processing and identification processing) in parallel. Here, the saving condition is satisfied when an abnormality occurs in the PLC, when a device to be a saving trigger is designated in advance by the user and there is a predetermined change in the device, when an analysis command is issued by the user, when a monitoring cycle for periodic monitoring has elapsed, when an analysis command is issued from the extension unit connected to the basic unit 3, and the like. The saving conditions may be preset by the user and saved in the storage apparatus 32 of the basic unit 3 as a part of the project data. When the CPU 31 detects that the saving condition has been satisfied, the CPU 31 issues a command to store the device value saved in the first buffer 37a into the memory card 44, such as a secure digital (SD) card, and notifies the extension unit 4a that the data to be analyzed has been saved. A control program for the basic unit 3 is stored into the project storage part 35 as a part of project data. The control program for the basic unit 3 may be stored separately from the project storage part 35, or in addition to the project storage part 35, in the storage apparatus 32. As shown in FIG. 4, the basic unit 3 and the extension unit 4 are connected to each other via an extension bus 90, which is a type of communication bus. In FIG. 4, a communication circuit relating to the extension bus 90 is mounted on the CPU 31 but may be mounted as a part of the communication part 33. The communication part 33 may have a network communication circuit. The CPU 31 receives the project data from the PC 2a via the communication part 33.

Here, a supplemental description will be given of the extension bus 90. The extension bus 90 is a communication bus used for input/output refresh. The input/output refresh is processing for fetching an input/output value at the time of executing the ladder program before each execution of the ladder program, and on the basis of the fetched input/output value when the ladder program is repeatedly executed and is processing for not fetching the input/output value even when the input/output value changes during one execution. The value fetched by the input/output refresh is stored into the device memory as the device value of the device corresponding to each input/output. By the input/output refresh, the device value is transmitted/received between the basic unit 3 and the extension unit 4, and the device value of the corresponding device in the device memory is updated. The input/output refresh is executed at every scan cycle (i.e., every scan) in which the ladder program is executed once. One scan cycle includes an input/output refresh execution period, a ladder program execution period, and an end processing execution period.

The extension unit 4 includes a CPU 41 and a memory 42. Furthermore, the extension unit 4a may include a memory card (e.g., an SD card) that is detachable from the extension unit 4a and stores time-series data that is control data from each device. A CPU 41b of the extension unit 4b controls the field device 10 in accordance with an instruction (device value) from the basic unit 3 stored in the device. The CPU 41b stores the control result of the field device 10 in a device called a buffer memory. The control result stored into the device is transferred to the basic unit 3 by the input/output refresh. The control result stored in the device is transferred to the basic unit 3 in accordance with a read command from the basic unit 3 even at the timing different from the input/output refresh. The memory 42 includes a RAM and a ROM. In particular, in the RAM, a storage area to be used as a buffer memory is ensured. The memory 42 may have a buffer that temporarily holds data (examples: device value, still image data, video data) acquired by the field device 10.

A CPU 41a of the extension unit 4a functioning as the data utilization unit communicates with the PC 2b via a communication part 43 and the cable 9b. The data utilization unit is an extension unit that executes a data utilization application. The data utilization application includes: a flow for collecting or processing control data (time-series data) saved in the memory card 44 provided in the basic unit 3 or a memory card provided in the extension unit 4a; a flow for performing processing related to the collected data; a dashboard that displays the execution results of the flows; and a transmission part that transmits the results of the flows to the outside. Note that the data utilization application does not issue a saving command to the memory card 44 at the time of abnormal device analysis but refers to data saved when the saving condition as described above has been satisfied, and performs analysis using the data saved in the memory card 44.

Note that the function for collecting the control data may be achieved by a user program except for the data utilization application. The function for performing the processing related to the collected data includes an identification function for identifying an abnormal device at the time of abnormality of the programmable logic controller, an analysis function for analyzing a deviation from the time-series data at the normal time and verifying a device value different from the usual value, and a monitoring function for periodically performing the above analysis. The flow may have an arithmetic block for collecting data, an arithmetic block for executing data processing, an arithmetic block for creating display data, and the like. The dashboard has graph display parts, numerical display parts, and the like. These display parts may be achieved by HyperText Markup Language (HTML) data, Cascading Style Sheets (CSS) data, a JavaScript (registered trademark) code, or the like. Note that the aggregate of the HTML data, the CSS data, and the JavaScript (registered trademark) code may be referred to as a web application. In the present embodiment, the flow is achieved by a flow template. The flow template is prepared in advance for each application and has one or more arithmetic blocks in which a flow template parameter designated by the user is set. The dashboard is also enabled by the template. The dashboard template has one or more display parts to which a dashboard template parameter designated by the user is set. The dashboard template parameter is, for example, various kinds of information such as a dashboard name, a device name, a numerical value, and a unit variable name. The unit variable is a variable for the extension unit 4a to hold the execution result of the flow.

<Functions Provided by CPU of Basic Unit>

Figure 5:
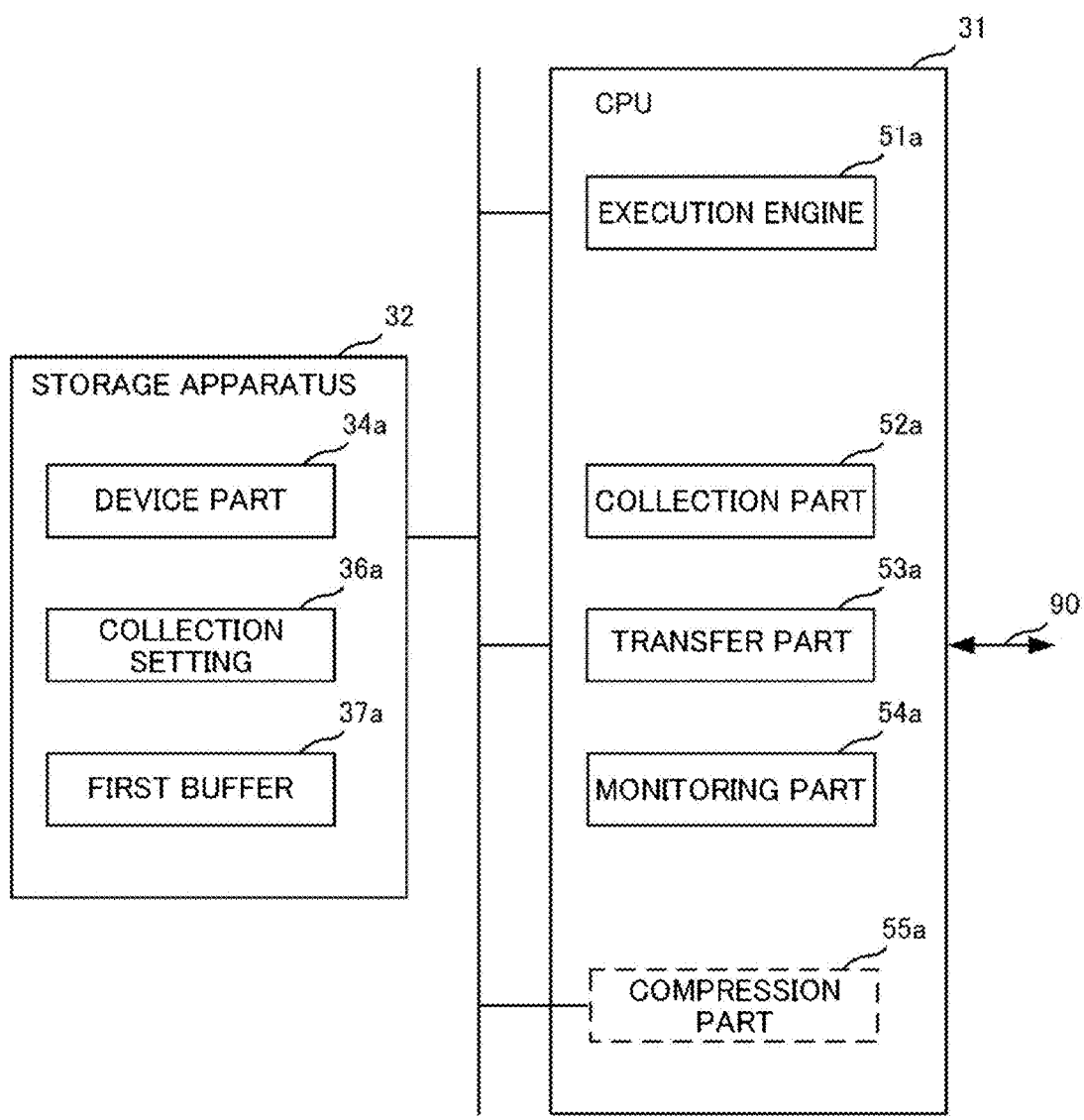
FIG. 5 is a diagram for explaining a basic unit.

FIG. 5 shows functions achieved by the CPU 31 with respect to data utilization. An execution engine 51 repeatedly executes a user program for each scan cycle that is an execution cycle. The execution engine 51 may be achieved by an ASIC, an FPGA, or the like, provided outside the CPU 31. ASIC is an abbreviation of application specific integrated circuit. FPGA is an abbreviation of field programmable gate array. These dedicated circuits can often execute specific data processing at a higher speed than a combination of a CPU and a program. A collection part 52a collects a device value to be collected from the device part 34 for each scan cycle that is the execution cycle, creates a data record, and stores the data record into the first buffer 37a. In a case where the execution engine executes the ladder program as the user program, the scan cycle of the ladder program corresponds to the execution cycle, and in a case where the execution engine executes the motion program as the user program, the control cycle of the motion program corresponds to the execution cycle. In a case where the device value is collected for each scan cycle of the ladder program, the device value to be collected may be collected from the device part 34 during the end processing period in the scan cycle, and a data record may be created and stored into the first buffer 37a. It is not essential to collect data during the end processing period, and a description for collecting data (program code such as trigger command) may be included in the user program executed by the execution engine 51. However, in the case where the data is collected by the end processing, there is an advantage that the user program need not be changed. A collection cycle is set by the user, transferred as part of the project data, and stored in the storage apparatus 32 of the basic unit 3 as a collection setting 36a. The collection setting 36a includes not only the collection cycle but also a device to be a collection target. Note that the collection cycle may be a cycle different from the scan cycle that is the execution cycle, or the control cycle of the motion program. In this case, for each collection cycle designated by the collection setting 36a, the device value to be collected may be collected from the device part, and a data record may be created and stored into the first buffer 37a. Here, in collecting data, the basic unit 3 may analyze characteristics such as periodicity and continuity of each device value by its own device or by the extension unit 4a and classify the device according to the analysis result. On the other hand, when the data is collected, such analysis may not be performed but may be performed by the own device or by the extension unit 4a at the timing when pieces of time-series data of a predetermined number of scan cycles have been collected or when it is necessary to analyze the data at the time of occurrence of an abnormality.

By providing the first buffer 37a, the execution engine 51 is less susceptible to an increase in scan time due to collection or transfer processing. The device value to be collected is designated by the collection setting 36a. The collection settings 36a may be stored into the basic unit 3 by the PC 2a or the extension unit 4a. A transfer part 53a stores one or more data records stored in the first buffer 37a into the memory card 44 provided in the basic unit 3 and transfers the data records saved in the memory card 44 to the extension unit 4a. Note that the transfer part 53a executes transfer processing when the communication traffic in the extension bus 90 is free, but an extension bus dedicated to transmitting a data record to the extension unit 4a may be provided.

Alternatively, the transfer part 53a may transfer one or more data records stored in the first buffer 37a to the extension unit 4a via the extension bus 90, and the transferred data may then be stored into a memory card provided in the extension unit 4a. In this case, it is preferable to provide an extension bus dedicated to transmitting a data record to the extension unit 4a. As described above, the data record is saved into the memory card 44 only when the saving condition is satisfied. Hence it is not necessary to transfer unnecessary data to the extension unit 4a, so that the communication traffic can be reduced in weight.

The transfer processing may be executed while avoiding a period in which an execution engine 51a executes the input/output refresh or a period in which data is read from the buffer memory of the extension unit 4 in accordance with a read command described in the user program. Note that the communication traffic of the extension bus 90 is monitored by a monitoring part 54a. For reducing the data record transfer time, a compression engine 55a may compress a plurality of data records. Note that the compression engine 55a need not be achieved by the CPU 31 but may be achieved by an ASIC or an FPGA. Thus, by adopting the first buffer 37a, the transfer processing and the user program can be executed asynchronously.

<Functions of Data Utilization Unit>

Figure 6:
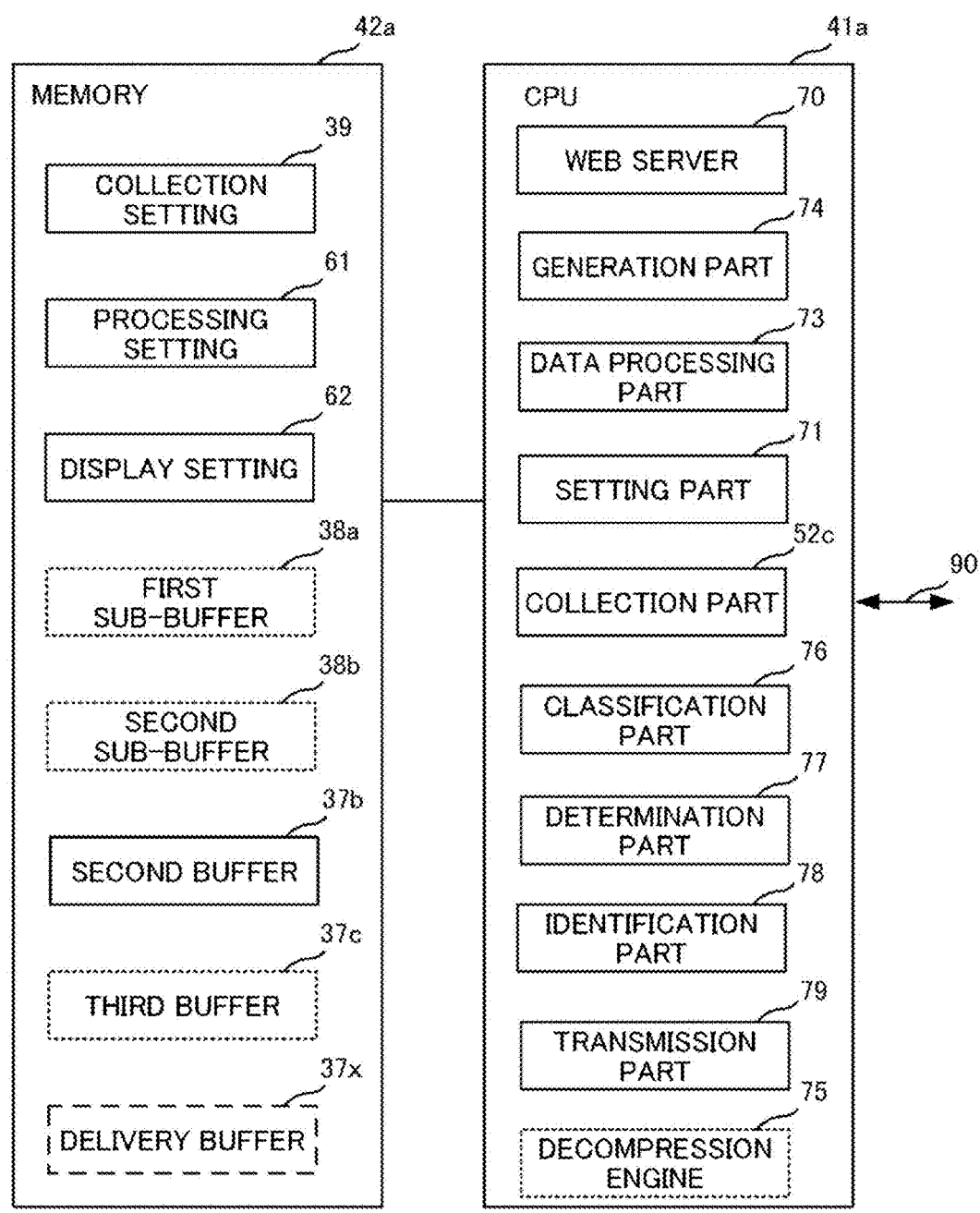
FIG. 6 is a diagram for explaining a data utilization unit.

FIG. 6 is a diagram for explaining functions achieved by the CPU 41a of the extension unit 4a.

A collection part 52c is a function for collecting (acquiring) data from a first buffer of the basic unit 3 in accordance with a collection setting 39. The collection settings 39 are set by the user, transferred as a part of the project data, and stored into a memory 42a of the extension unit 4a. The collection part 52c can be achieved by the CPU 41a executing a control program such as a user program. The collection part 52c sets the basic unit 3 such that the basic unit 3 collects the device value designated by the collection setting 39 and transfers the device value to a second buffer 37b of the extension unit 4a. Note that the collection part 52c may write the collection setting 36a of the basic unit 3 included in the collection setting 39 into the storage apparatus 32 of the basic unit 3. It is desirable that the collection part 52c and a data processing part 73 can operate basically asynchronously. A buffer may be provided to achieve this. Here, a description is given of a working example in which the basic unit 3 collects a device value and temporarily stores the device value in a buffer, and then, the collection part 52c of the extension unit 4a collects the device value at a predetermined timing. However, the present invention is not limited thereto, and an analysis unit such as an extension unit 4a may directly acquire a device value and store the device value into a memory provided in the extension unit 4a.

The collection part 52c may set the extension unit 4b such that the extension unit 4b collects a device value designated by the collection setting 39 and transfers the device value to a third buffer 37c of the extension unit 4a. By providing the second buffer 37b and the third buffer 37c, data can be collected without dropping even when the processing load of the data processing part 73 fluctuates. The collection part 52c may write a collection setting 36b (FIG. 7) of the extension unit 4b included in the collection setting 39 into a memory 42b of the extension unit 4b. Note that these setting functions may be achieved by a setting part 71. The setting part 71 receives the collection setting 39, a processing setting 61, and a display setting 62 from the PC 2a or the PC 2b and writes the received setting into the memory 42a. The processing setting 61 includes information and a flow (program) for defining data processing to be executed on the collected data by the data processing part 73. The display setting 62 includes a dashboard template (HTML data, CSS, JavaScript (registered trademark) code, etc.) that provides a data processing result to the web browser 18 through a web server 70.

Further, the CPU 41a of the extension unit 4a achieves a classification part 76, a determination part 77, an identification part 78, and a transmission part 79 as functional components. The classification part 76 analyzes the characteristic of the time-series data of each device collected (acquired) from the first buffer of the basic unit 3 by the collection part 52c and classifies the time-series data on the basis of the characteristic. The classification method will be described later with reference to FIG. 12. Although the classification part 76 executes the classification processing at an arbitrary timing, the classification part 76 basically executes the classification processing at the timing when the operation of the system is started or at the timing when an instruction from the user is received. The determination part 77 determines a parameter used at the time of identifying an abnormal device in accordance with the time-series data classified by the classification part 76 and stores the parameters into the memory 42a. The parameter determination processing will be described later. The determination part 77 performs parameter determination processing when the classification processing is executed by the classification part 76, and when a parameter has already been determined for the same device, the determination part 77 updates the parameter. At the time of updating, the updating may be performed by overwriting, or a new parameter may be determined from two parameters by taking an average value or by some other means. Further, the processing at the time of updating may be determined for each device. As described above, the classification part 76 and the determination part 77 are processing parts that function in a learning phase for analyzing the collected data and learning what the data at the normal time is like and determine a parameter used at the time of identifying the abnormal device. On the other hand, the identification part 78 is a processing part that functions in an estimation phase for estimating the abnormal device. The identification part 78 identifies an abnormal device from the time-series data of each device collected by the collection part 52c by using the determined parameter. Details of the identification processing will be described later. Here, the "abnormal device" indicates a storage area of the device memory in which data different from that in the normal time is held. The estimation of the abnormal device by the identification part 78 may be started when an abnormality occurs during the operation of the programmable logic controller, periodically, or on the basis of a monitoring instruction from the user. The estimation may be started when the saving condition set in advance by the user is satisfied.

A generation part 74 substitutes the data processing result into the template of the dashboard in accordance with the display setting 62 that defines the display parts of the dashboard to generate the display data of the dashboard. The generation part 74 generates display data (screen information) for displaying the identification result on the basis of the identification result of the abnormal device by the identification part 78. The display data may be, for example, HTML data, image data, cascading style sheets (CSS), a JavaScript (registered trademark) code, or the like. The display parts include, for example, pie chart parts, bar chart parts, line chart parts, numerical value display parts, and the like. When the web page of the dashboard is accessed by the web browser 18, the web server 70 transmits the display data of the dashboard to the web browser 18. The web browser 18 receives the display data and displays the display data in the dashboard. The transmission part 79 transmits the display data generated by the generation part 74 to the external apparatus. No particular limitation is imposed on the communication line and communication method used at the time of transmission. A wireless connection or wired connection may be used.

Note that a plurality of data utilization applications may be provided. In this case, the required data and read timing may be different for each data utilization application, and a sub-buffer may be ensured in the memory 42a for each data utilization application. The collection part 52c reads the data record stored in the second buffer 37b and stores the data for a first data utilization application into a first sub-buffer 38a. The collection part 52c reads the data record stored in the second buffer 37b and stores the data for a second data utilization application into a second sub-buffer 38b. The collection part 52c reads the data record stored in the third buffer 37c and stores the data for the first data utilization application into the first sub-buffer 38a. The collection part 52c may read the data record stored in the third buffer 37c and store the data for the second data utilization application into the second sub-buffer 38b. The data processing part 73 reads data from the first sub-buffer 38a in accordance with the first data utilization application, executes data processing, and generates a processing result. The data processing part 73 reads data from the second sub-buffer 38b in accordance with the second data utilization application, executes data processing, and generates a processing result. A decompression engine 75 is a function paired with the compression engine 55a of the basic unit 3 and a compression engine 55b of the extension unit 4b. The decompression engine 75 decompresses the data compressed and transferred by the basic unit 3 and stores the data into the second buffer 37b. The decompression engine 75 decompresses the data compressed and transferred by the extension unit 4b and stores the data into the third buffer 37c. This will reduce the congestion of the communication traffic of the extension bus 90. The decompression engine 75 may be achieved by an ASIC or FPGA. In this manner, data transmission between the basic unit 3 and the extension units 4a, 4b is performed via the extension bus 90.

Figure 16:
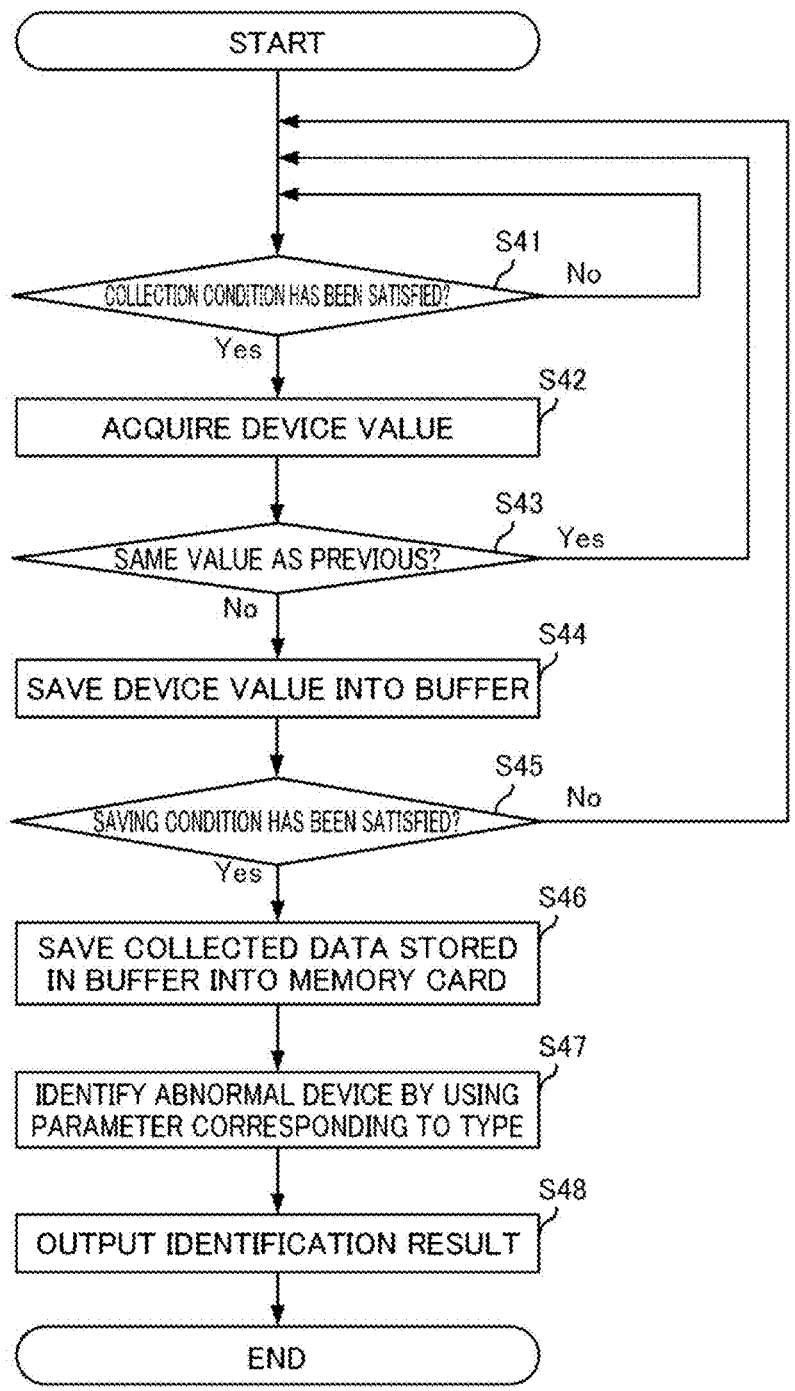
FIG. 16 is a flowchart showing a processing procedure of an estimation phase.

There are cases where a plurality of data are required for each data utilization application. In such a case, a plurality of pieces of data necessary for the sub-buffer may be stored while a block of data collected by each scan is maintained in the buffer. Further, when data is distributed to the sub-buffer as well, a timestamp or the like may be given to each record. As shown in FIG. 16, the second buffer 37b (may be the third buffer 37c) holds a block of collected data. One record includes a scan number, a timer value (timestamp), and collected data. In this example, the collected data includes relays RL1 to RL3 and devices Dev1, Dev2. A first data utilization application 1601 requires the relays RL1 to RL3 of the collected data. Therefore, the scan number, the timer value, and the relays RL1 to RL3 are read from the second buffer 37b and stored into the first sub-buffer 38a. The first data utilization application 1601 reads the scan number, the timer value, and the relays RL1 to RL3 from the first sub-buffer 38a to create a display screen (source data). A second data utilization application 1602 requires the relays RL3 and the devices Dev1, Dev2 of the collected data. Therefore, the scan number, the timer value, the relay RL3, and the devices Dev1, Dev2 are read from the second buffer 37b and stored into the second sub-buffer 38b. The second data utilization application 1602 reads the scan number, the timer value, the relay RL3, and the devices Dev1, Dev2 from the second sub-buffer 38b to create a display screen (source data). By utilizing the sub-buffer in this manner, the original data can be maintained in the buffer without being changed. The original data held in the buffer becomes available for other purposes.

<Functions of Extension Unit 4b Related to Data Utilization>

Figure 7:
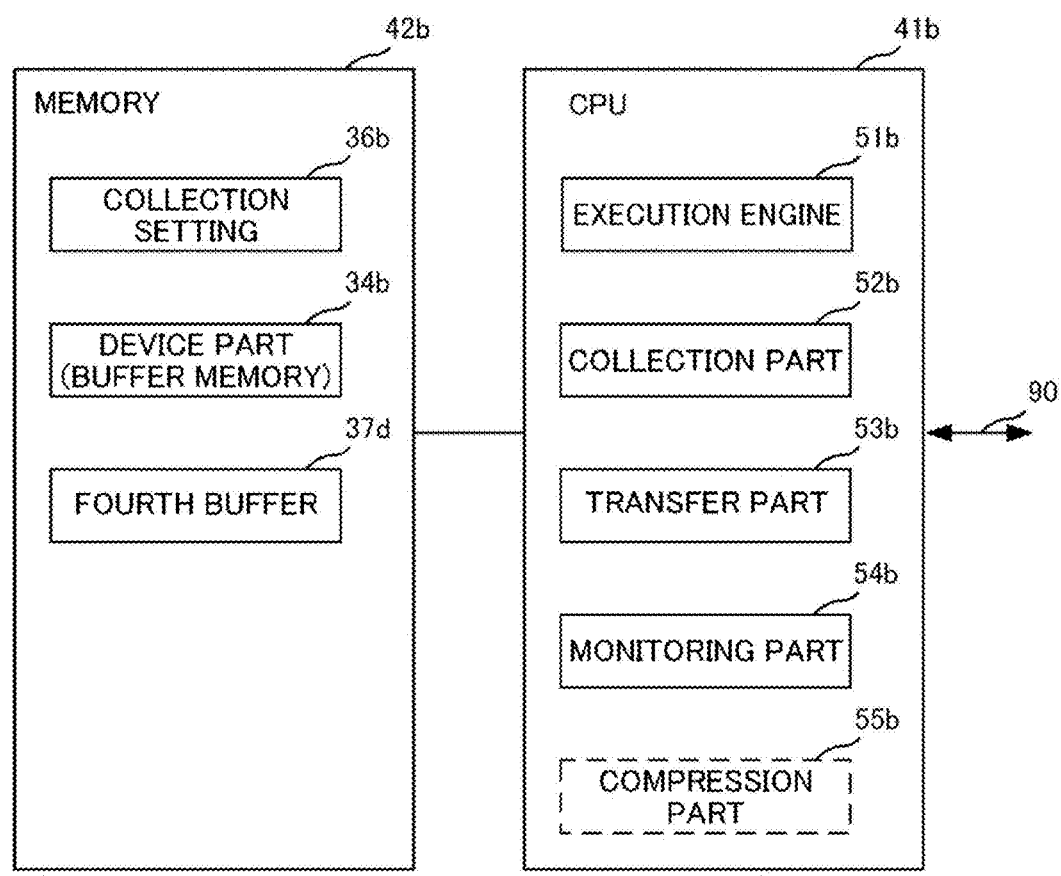
FIG. 7 is a diagram for explaining an extension unit.

FIG. 7 is a diagram for explaining functions achieved by the CPU 41b of the extension unit 4b.

An execution engine 51b executes the basic function of the extension unit 4b (execution of a motion flow when in the case of a motion unit). A collection part 52b collects the data designated by the collection setting 36 from the device part 34b at the timing of the designation by the collection setting 36 and stores the data into a fourth buffer 37d. A transfer part 53b reads the data record stored in the fourth buffer 37d at the timing of the designation by the collection setting 36 or at the timing when the transfer request is received by the extension unit 4a, and transfers the data record to the third buffer 37c of the extension unit 4a via the extension bus 90. Note that the transfer part 53b may transfer the data record at the timing when the communication traffic of the extension bus 90 monitored by the monitoring part 54 is small. The compression engine 55b compresses the data records in accordance with the collection settings 36. That is, the transfer part 53b may transfer the data record, subjected to information compression by the compression engine 55b, to the extension unit 4a. The compression engine 55b may be achieved by the CPU 41b but may be achieved by an ASIC or an FPGA from the viewpoint of high-speed processing and a reduction in the processing load of the CPU 41b.

<Example of Data Record>

Figure 8:
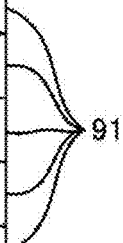
FIG. 8 is a diagram for explaining a format of a data record.

FIG. 8 shows data records 91 written by the collection part 52a into the first buffer 37a. The plurality of data records 91 are examples of time-series data. In this example, the collection part 52a collects device values of device names Dev0, Dev1, Dev10 from a device part 34a for each scan cycle, adds time information acquired from a collection count and a timer to create one data record and stores the data record into the first buffer 37a. Note that the collection target may be data stored in a buffer memory or a device allocated to the extension unit 4b. In this example, the first buffer 37a is a first-in first-out (FIFO) type buffer. The collection count is a count value of a counter incremented by one every time one data record is collected. The collection count is a sequential number and is thus useful for detecting missing or compression of data records.

The time information such as a timestamp is useful, for example, at the time when data acquired by the basic unit 3 and data acquired by the extension unit 4b are displayed in the dashboard in a contrastable manner. Generally, the collection timing in the basic unit 3 does not coincide with the collection timing in the extension unit 4b. Thus, comparing the operation of the basic unit 3 with the operation of the extension unit 4b requires information for linking the data of the basic unit 3 with the data of the extension unit 4b. In general, time information can be synchronized between the basic unit 3 and the extension units 4a, 4b by inter-unit synchronization or the like. Therefore, the basic unit 3 and the extension unit 4b each gives time information at the time when the data records are collected to the data records, so that the data processing part 73 can align a plurality of data records acquired by different units on the time axis.

<Transfer Timing>

Figure 9:
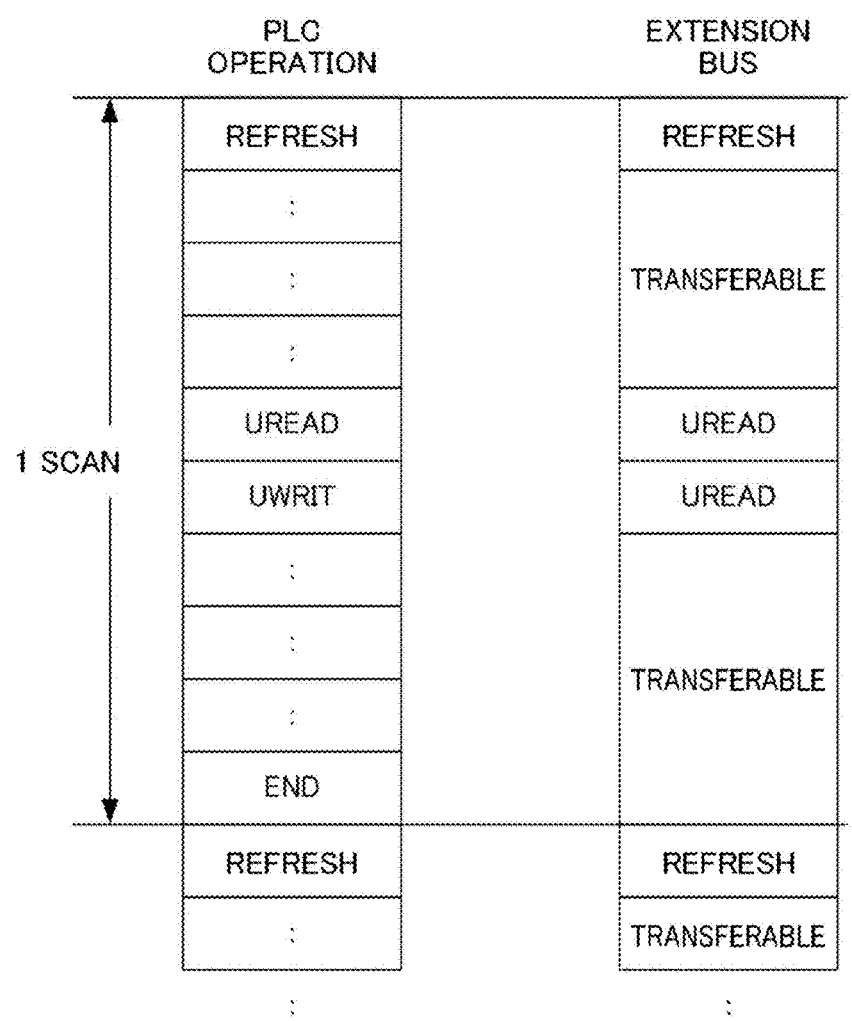
FIG. 9 is a diagram for explaining a transfer timing.

FIG. 9 is a diagram for explaining the transfer timing of the data record. As shown in FIG. 9, the PLC 1 repeatedly performs input/output refresh, execution of a user program, and end processing. In order to reduce the elongation of the scan cycle, the transfer processing is executed, avoiding a period for the input/output refresh. Similarly, in order to reduce the elongation of the scan cycle, the transfer processing is executed, avoiding the execution periods of UREAD and UWRIT. UREAD is a command to read data from the buffer memory allocated to the extension unit 4, and is described in the user program. Thus, during the execution period of the user program, the basic unit 3 accesses the extension unit 4 in accordance with UREAD to acquire data from the buffer memory. UWRIT is a command to write data into the buffer memory allocated to the extension unit 4 and is described in the user program. During the execution period of the user program, the basic unit 3 accesses the extension unit 4 in accordance with UWRIT and writes data into the buffer memory.

As shown in FIG. 9, the transfer processing is executed on the extension bus 90 during the remaining transferable period excluding the input/output refresh, UREAD, and UWRIT. For example, it is assumed that a setting has been made by the collection setting 36a to execute transfer processing for five data records at a time. In this case, the transfer part 53a executes the transfer processing after the storage of the five data records into the first buffer 37a is completed and in a first transferable period or at the timing when the transfer request is received by the extension unit 4a.

<Information Compression>

Figure 10:
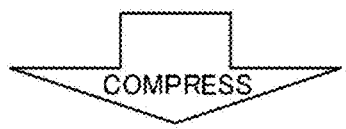
FIG. 10 is a diagram for explaining information compression.

FIG. 10 is a diagram for explaining information compression of data records. A data record group 92a shows data records before information compression. Note that values changed from the previous scan cycle are shaded. Here, four relay devices RL1, RL2, RL3, RL4 are designated as collection targets. A scan number is adopted as the collection count. The counter may be time information (examples: a numeric value indicating the time interval between when a relay is turned on and when the relay is turned off) acquired by the timer or the like. In the data record group 92a, there is no change point of the relay device between a data record of a scan number "1" and a data record of a scan number "2". That is, the data record of the scan number "2" can be compressed (discarded or deleted). However, a relay device RL1 of a data record of a scan number "3" is different from a relay device RL1 of the data record of the scan number "1". With the scan number "3" having a change point as above, the data record of the scan number "3" has not been compressed. Since there is no change point of the relay device between the data record of the scan number "3" and a data record of a scan number "4," the data record of the scan number "4" can be compressed. Similarly, since there is no change point of the relay device between a data record of a scan number "5" and a data record of a scan number "6," the data record of the scan number "6" can be compressed. By performing the information compression focusing on a change point as described above, a compressed data record group 92b is achieved. Each data record constituting the compressed data record group 92b has a change point. As described above, in the present embodiment, in a group (RL1 to RL4) of one or more devices, when there is no change in the value collected in the previous scan cycle and the value collected in the current scan cycle in all the devices of the group as the collection target, the value collected in the current scan cycle is deleted, and the time-series data to be collected is compressed. Although the working example of the management in a group has been described here, the present invention is not intended to be limited, and data may be compressed by determining ON/OFF for individual devices without grouping. In addition, in the case of data that is not in the bit format of ON/OFF (analog value), the control may be performed so as to detect a change in the device value from the previous time for each device and leave the data when the change is detected.

<Overall Flow>

Figure 11:
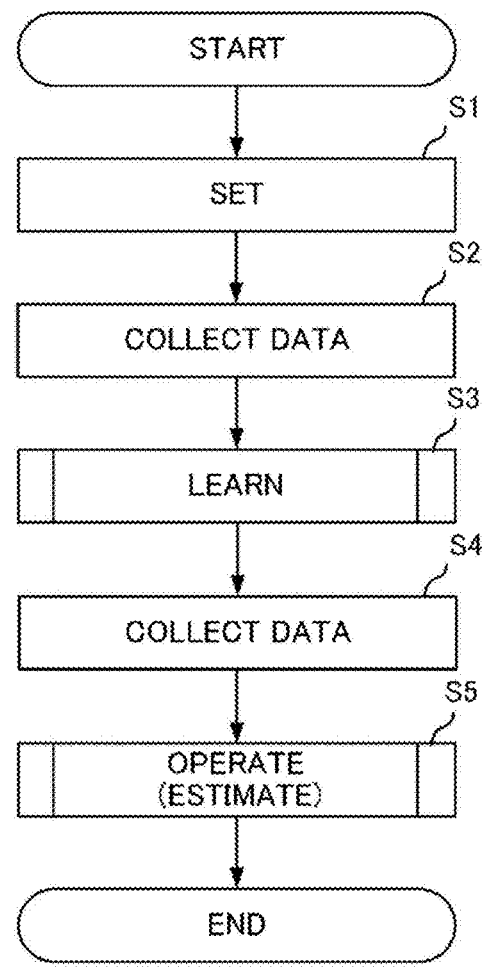
FIG. 11 is a flowchart showing an overall flow.

FIG. 11 shows an overall flow from data collection to identification processing of an abnormal device in the programmable logic controller according to the present embodiment. The processing described below will be described as processing to be executed by the CPU 41a of the extension unit 4a. However, the present invention is not intended to be limited, and a part of the processing may be executed by the basic unit 3 or another extension unit 4b or may be executed by the external apparatus (analyzer) communicatively connected to the programmable logic controller.

In S1, the CPU 41a (setting part 71) sets the basic unit 3 and the extension unit 4b. For example, the CPU 41a transfers the collection setting 36a for the basic unit 3 to the basic unit 3. The basic unit 3 stores the collection setting 36a into the storage apparatus 32. The CPU 41a transfers the collection setting 36b for the basic unit 3 to the extension unit 4b. The extension unit 4b stores the collection setting 36b into the memory 42b.

In S2, the CPU 41a (collection part 52c) collects time-series data of a device as a collection target in accordance with the set collection setting. Here, the processing may be caused to proceed to the next processing when a predetermined amount of collected data is stored. That is, here, the timing of shifting to the learning phase is determined, and when an amount of data sufficient for learning (time-series data for a predetermined number of scan cycles) is stored into a storage part such as a buffer or a memory card, the processing proceeds to the next processing.

In S3, the CPU 41a (classification part 76 and determination part 77) analyzes the data collected in S2 and creates a learning model (in the present embodiment, a parameter) for identifying an abnormal device. The processing of the learning phase will be described later with reference to FIG. 15.

In S4, the CPU 41a (collection part 52c) collects the time-series data of the device as the collection target in accordance with the set collection setting. The processing of S4 and thereafter is actually the processing at the time of the system operation. The data collection here is performed in basically the same manner as the data collection in S2. Note that the learning phase may be performed at the start of the operation of the system or may be started at the timing when an instruction is received from the user. The learning phase may be performed periodically. That is, at the time of the system operation, data is always collected, the learning phase is periodically performed, and the estimation phase is performed at the timing when the saving condition is satisfied. For example, when an abnormality occurs during the operation of the programmable logic controller and the basic unit 3 detects the satisfaction of the saving condition, the time-series data collected in the first buffer 37a of the basic unit 3 is saved into the memory card 44. In S5, the CPU 41a (identification part 78) acquires the time-series data saved in the memory card 44 and applies the parameter determined in S3 to identify an abnormal device. That is, the processing in the estimation phase is performed here, and the details will be described later with reference to FIG. 16. Further, the CPU 41a generates display data indicating the identification result by the generation part 74 on the basis of the identification result identified by the identification part 78 and displays the display data on the display part 5 of the basic unit 3 or transmits the generated display data or the identification result by the transmission part 79 to the external apparatus via the communication part 43. In this case, the identification result is displayed to an operator in the external apparatus. The operation of S5 may be, in addition to the method in which the basic unit 3 detects the satisfaction of the saving condition and identifies an abnormal device when an abnormality occurs during the operation of the programmable logic controller as described above, a method in which a device value is constantly collected and whether there is no abnormality in the device value is analyzed, a method in which a device value collected by the basic unit is analyzed when a device value previously determined by the user makes a predetermined change, or a method in which whether there is no abnormality in the device value is analyzed periodically or on the basis of a monitoring instruction from the user. In these cases, the term "abnormal" indicates that the device value to be analyzed is different from the device value at the normal time, that is, deviates from the data at the normal time, and does not necessarily indicate an abnormality occurring in the programmable logic controller. Note that the processing procedure of the estimation phase for identifying an abnormal device from the data collection considering the collection timing will be described later in detail with reference to FIG. 16.

<Classification of Collected Data>

Figure 12:
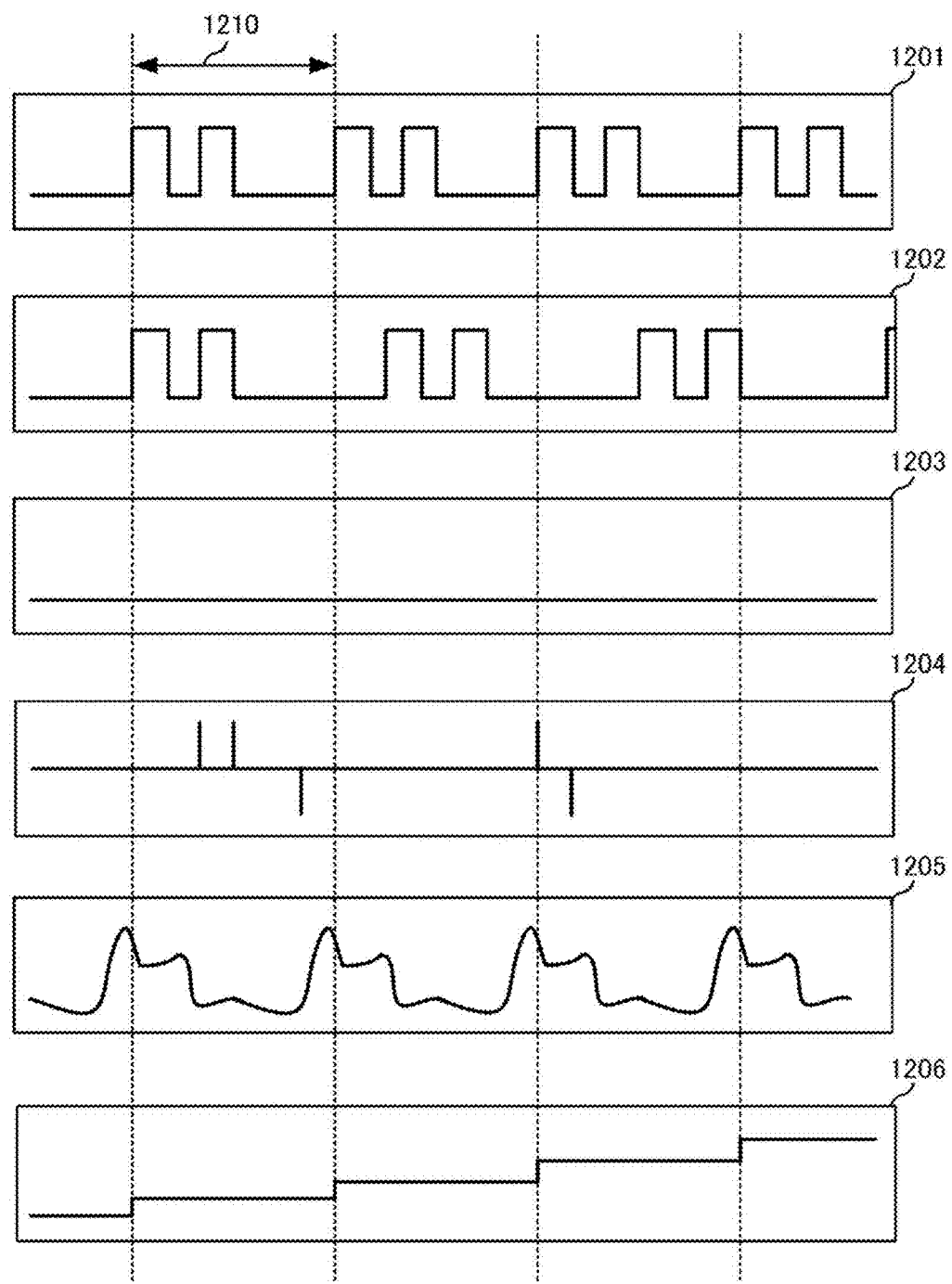
FIG. 12 is a diagram showing classifications of collected data.

FIG. 12 shows an example of the type of time-series data to be collected. Reference numerals 1201 to 1206 each denote a device signal (time-series data) of each type. The device signal may include an external signal. Note that the types described below are only examples, the present invention is not intended to be limited, and the present invention may be applied to other types. In the present invention, it is desirable that the types to be classified include at least two types of the plurality of types in order to improve the classification effect. Note that the classification of the time-series data at the time of learning is performed by the user selecting a device for determining a cycle (operation cycle) for classification and performed on the basis of the repeatability of the device.

Reference numeral 1201 denotes a device signal of a device that operates in synchronization with an operation cycle of the apparatus. Reference numeral 1210 denotes the operation cycle of the apparatus. In the 1201 type, a similar change pattern (steady change pattern) occurs for each operation cycle of the apparatus. In this type, for example, such a detection method is allocated where a steady change pattern is identified from time-series data acquired during a period that can be regarded as a normal state, and an abnormal device (a device different from usual) is identified on the basis of a deviation identified from the steady change pattern from the newly acquired time-series data. Specifically, variation in time with respect to the change point is measured for the change pattern of the time-series data of each of a plurality of cycles, which can be regarded as a normal state, and a threshold is set according to the measured variation. A detection algorithm for detecting an abnormal device is allocated on the basis of whether or not the change point of the time-series data acquired thereafter exceeds the range of a threshold set corresponding to the change point. For example, a plurality of waveforms for each operation cycle of the apparatus are superimposed, and on the basis of the variation of a point at which a device changes from OFF to ON, a reference value and a threshold of the change point are set, so that an abnormal device can be identified using these parameters. In each cycle of 1201, a relative time indicating the rising timing of a first signal or a phase in each cycle may be used as an evaluation variable, and a parameter corresponding to the evaluation variable may be determined on the basis of the variation of the evaluation variable. For example, when the phase in each cycle is used as an evaluation variable, an upper limit threshold and a lower limit threshold of the phase may be used as parameters.

On the other hand, reference numeral 1202 denotes a device signal of a device which is not synchronized with a scan cycle but operates in synchronization with a cycle except for the operation cycle of the apparatus. For this type as well, for example, such a detection method is allocated where a steady change pattern is identified from time-series data acquired during a period that can be regarded as a normal state, and an abnormal device (a device different from usual) is identified on the basis of a deviation identified from the steady change pattern from the newly acquired time-series data. Specifically, variation in time with respect to the change point is measured for the change pattern of the time-series data of each of a plurality of cycles, which can be regarded as a normal state, and a threshold is set according to the measured variation. A detection algorithm for detecting an abnormal device is allocated on the basis of whether or not the change point of the time-series data acquired thereafter exceeds the range of a threshold set corresponding to the change point. In each cycle of 1202, a relative time indicating the rising timing of a second signal or a phase in each cycle may be used as an evaluation variable, and a parameter corresponding to the evaluation variable may be determined on the basis of the variation of the evaluation variable. For example, when the relative time in each cycle is used as an evaluation variable, an upper limit threshold and a lower limit threshold of the relative time may be used as parameters, respectively.

Reference numeral 1203 denotes a device signal of a device taking a constant value. In this type, for example, such a detection method is allocated where a value at the normal time is identified from time-series data acquired during a period that can be regarded as a normal state, and a newly acquired time-series data different from the identified value at the normal time is identified as an abnormal device (a device different from usual). Specifically, a detection algorithm is allocated where a value of the device in the time-series data that can be regarded as a normal state is set as a detection reference value, and an abnormal device is detected on the basis of whether or not the value of the time-series data acquired thereafter is different from the detection reference value set corresponding to the value at the normal time. In other words, when a value (constant value) changes, the value can be determined as abnormal. Reference numeral 1204 denotes a device signal of a device that operates irregularly. This type is excluded from data used at the time of identifying an abnormal device. Reference numeral 1205 denotes a device signal of a device taking an analog value. In the device taking an analog value, as described later, with the device value being not the device value of the bit device, the processing proceeds to No of S21 in FIG. 13A (S27 of FIG. 13B), and as shown in FIG. 13B, an algorithm in the estimation phase is different depending on the method for changing data. As the algorithm in the estimation phase of the device taking an analog value, various methods such as a dynamic time warping method and an autoregressive model can be used. Reference numeral 1206 denotes a device signal of a monotonically increasing and monotonically decreasing device. In this type, an abnormal device is identified using a differential value and an integrated value. Further, a relative time indicating the timing of a monotonous increase or a monotonous decrease or a phase in each cycle may be used as an evaluation variable. Note that the types described here are only examples, and devices classified into other types are also assumed, and some can take a plurality of states (stepped device signal, etc.), for example. Those taking a plurality of states can be determined to be abnormal when changing to a state different from the state at the normal time.

Here, the device type will be described with reference to FIG. 14. As shown in FIG. 14, each device includes a 0, 1-bit type device, and a word type device or a floating-point number type device taking an analog value. Note that the word device further includes a 1-word unsigned integer (0 to 65535), a 1-word signed integer (−32768 to 32767), a 2-word unsigned integer (0 to 4294967295), and a 2-word signed integer (−214783648 to 214783647). In consideration of such a type, for example, when the rate of change per scan cycle is equal to or greater than a predetermined value and the type is not a bit, the device can be determined as the device taking an analog value.

<Classification>

Figure 13A:
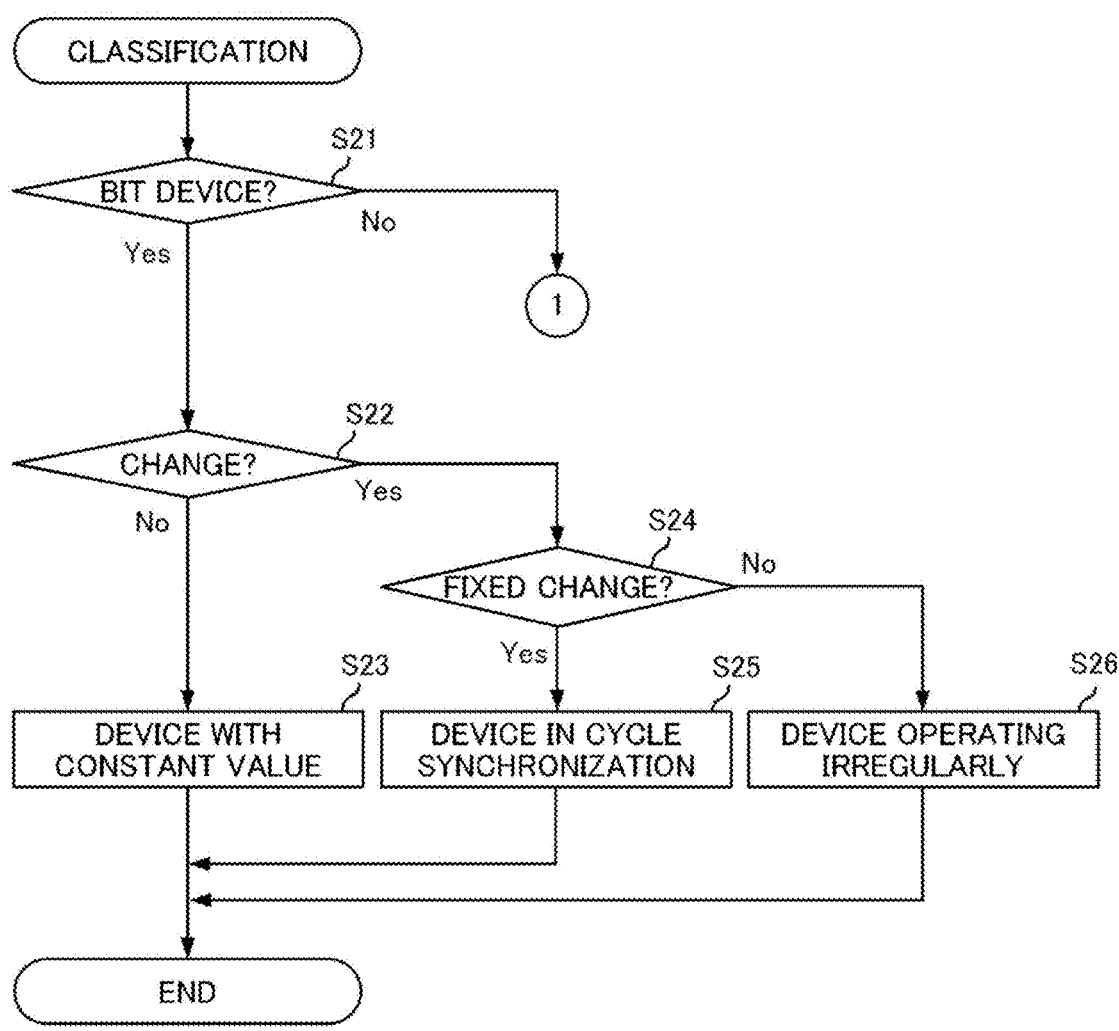
FIG. 13A is a flowchart showing a processing procedure of classification.
Figure 13B:
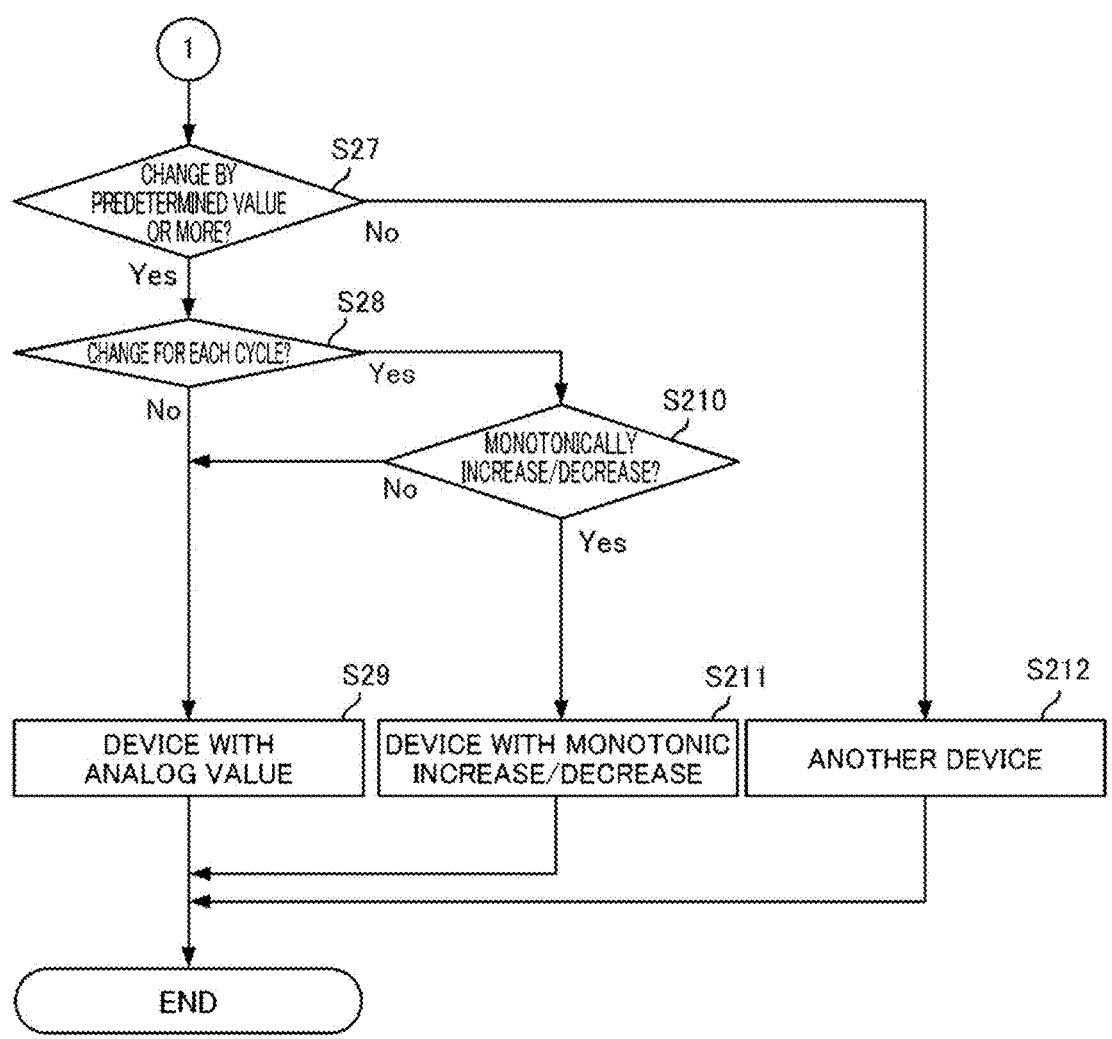
FIG. 13B is a flowchart showing a processing procedure of classification.

FIGS. 13A and 13B are flowcharts showing a processing procedure used at the time of classifying the collected data. The processing described below is achieved by the CPU 41a of the extension unit 4a. However, the present invention is not intended to be limited, and a part of the processing may be executed by the basic unit 3 or another extension unit 4b or may be executed by the external apparatus (analyzer) communicatively connected to the programmable logic controller.

In S21, the CPU 41a determines whether or not the time-series data to be classified is the device value of the bit device. When the device value is the device value of the bit device, the processing proceeds to S22; otherwise, the processing proceeds to S27 of FIG. 13B.

In S22, the CPU 41a determines whether or not there is a change in the value of the time-series data to be classified. When there is a change, the processing proceeds to S24, and when there is no change and a constant value is taken, the processing proceeds to S23. In S23, the CPU 41a classifies the time-series data to be classified as the device (1203) taking a constant value and ends the processing. As the classification information, information associated with the time-series data is stored, for example, flag information indicating a classified type is stored in association with the time-series data or discrimination information indicating a device corresponding to the time-series data. As thus described, the flag information of the type classified at the time of classification of the learning phase and the discrimination information of the device are associated and stored in advance, whereby in the estimation phase, the evaluation variable or parameter as the detection algorithm of the abnormal device can be easily selected according to the type associated with the discrimination information of the device in accordance with which device the time-series data to be verified is the data from. That is, in the estimation phase, it is possible to omit the processing of identifying which type the time-series data to be verified corresponds to. Although the flag information indicating the classified type has been shown as an example as the classification information, algorithm information indicating an algorithm for identifying an abnormal device may be used instead of the flag information. When the device corresponding to the time-series data is a variable, needless to say, the discrimination information stored as the classification information is discrimination information indicating the variable.

In S24, when there is a change in the value of the time-series data, the CPU 41a determines whether the change is a steady change pattern in each cycle. When it is determined that the pattern is a steady change pattern, the processing proceeds to S25, and when it is determined that the pattern is not a steady change pattern, the processing proceeds to S26. Here, the steady change pattern indicates a pattern that changes in a similar pattern in each cycle. As described above, the steady change pattern is a pattern in which the value of the time-series data changes in each cycle and is also referred to as a fixed change pattern since being a similar fixed pattern during each cycle. In S25, the CPU 41a classifies the device as a device that operates in a predetermined cycle, and ends the processing. As described above, the device that operates in a predetermined cycle includes the device (1201) that operates in synchronization with an operation cycle of the apparatus and the device (1202) that operates in synchronization with a cycle except for the operation cycle of the apparatus, and the CPU 41a classifies the device as each of the devices. On the other hand, in S26, the CPU 41a classifies the device as the device (1204) that operates irregularly and ends the processing.

Note that the CPU 41a may specify the operation cycle of the apparatus or a cycle except for the operation cycle of the apparatus on the basis of a change in the value of the time-series data relating to a specific device. For example, the device value of the specific device has one pulse within each operation cycle of the apparatus and is collected as time-series data having a change point defining the starting timing of each operation cycle. That is, the value of the specific device changes in synchronization with the operation cycle of the apparatus, and the change point defines the operation cycle. Such specific devices may be set by the operator's selection. Similarly, the device defining a cycle except for the operation cycle may also be set by the operator's selection. Naturally, the operation cycle of the device may be automatically specified from the collected time-series data or may be made adjustable by the operator after the identification. Thus, the operator can be further supported, and a user-friendly operating system can be provided even for an inexperienced operator. Further, a device that operates in a cycle except for the operation cycle may be defined as a device that operates irregularly on the basis of the operation cycle, and for example, when a device that specifies a cycle except for the operation cycle is not set, the CPU 41a classifies the device that operates in a cycle except for the operation cycle as the device (1204) that operates irregularly.

On the other hand, when it is determined in S21 that the device is not a bit device, the processing proceeds to S27 shown in FIG. 13B, and the CPU 41a determines whether or not the time-series data to be classified has changed by a predetermined value or more. Here, it is determined whether or not an extreme value of a changing signal is equal to or greater than a predetermined value. When there is a change, the processing proceeds to S28; otherwise, the processing proceeds to S212.

In S28, the CPU 41a determines whether or not the change has been made in a predetermined cycle, and when the change has not been made in the predetermined cycle, the processing proceeds to S29, and when the change has been made so, the processing proceeds to S210. In S210, the CPU 41a determines whether or not the changing value is monotonically increasing or monotonically decreasing. When the changing value is monotonically increasing or monotonically decreasing, the processing proceeds to S211; otherwise, the processing proceeds to S29.

In S29, the CPU 41a classifies the device as the device (1205) with an analog value and ends the processing. There are various types of devices of analog values, and individual correspondence is performed according to the type of the device to be classified. On the other hand, in S211, the CPU 41a classifies the device as the device (1206) with a monotonic increase or a monotonic decrease and ends the processing. In S212, the CPU 41a classifies the device as another device and ends the processing. When it is determined that the device is another device, the characteristic of the time-series data to be classified cannot be extracted, and the characteristic operation at the normal time cannot be identified, so that the device is not used at the time of identifying an abnormal device.

As described above, the CPU 41a automatically classifies the devices to be classified on the basis of the time-series data to be classified, but in addition to this, the CPU 41a may receive the setting of the type for the device to be classified from the operator. The CPU 41a receives the setting of the type for the device to be classified according to the operator's designation. Then, the CPU 41a stores flag information indicating the classified type in association with discrimination information indicating the device to be classified. The setting of the type for the device to be classified may be performed before the classification by the CPU 41a. For example, when the setting of the type is performed on a specific device of a plurality of devices to be classified on the basis of the operator's designation, the CPU 41a does not have to perform the classification based on the time-series data to be classified on the device to which the type has been set previously. On the other hand, the CPU 41a may perform the classification based on the time-series data to be classified for other devices for which the operator has not designated among the plurality of devices to be classified. In particular, in a case where the type of the device has been determined by the previous learning, and additional learning is further performed, the type of the device may be fixed by the previous learning on the basis of the operator's designation, and for the device requiring a change, the type of the device different from the type of the device may be determined by the previous learning on the basis of the operator's designation. For example, a type not used at the time of identifying an abnormal device may be determined.

The setting of the type for the device to be classified may be performed after the classification by the CPU 41a. For example, with respect to the plurality of devices to be classified, the CPU 41a automatically classifies the devices to be classified on the basis of the time-series data to be classified. Thereafter, the CPU 41a may update the automatically classified type of the device of the type having been set by the operator's designation to the type having been set for the device to be classified according to the operator's designation. Thus, even when the period of time-series data to be used for automatic classification is short or there is unbalance in the period, by the combination with known information by the operator, the device to be classified can be efficiently brought close to desired classification.

<Learning Phase>

Figure 15:
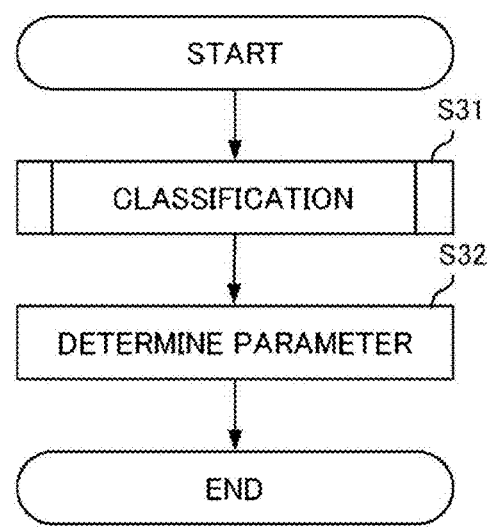
FIG. 15 is a flowchart showing a processing procedure of a learning phase.

FIG. 15 shows a processing procedure used at the time of analyzing collected time-series data, classifying the time-series data on the basis of the characteristic of each device, and determining a detection algorithm. The processing described below is achieved by the CPU 41a of the extension unit 4a. However, the present invention is not intended to be limited, and a part of the processing may be executed by the basic unit 3 or another extension unit 4b or may be executed by the external apparatus (analyzer) communicatively connected to the programmable logic controller.

The timing for starting the learning phase is, for example, the timing at which a predetermined period has elapsed from the previous learning processing, the timing at which a predetermined amount of time-series data has been collected, or a case where an instruction from the user is received. When the learning phase is started, the CPU 41a (collection part 52c) collects the time-series data of the device as the collection target in accordance with the set collection setting (S2).

In S31, the CPU 41a executes the classification processing. For example, when a predetermined amount of collected data is stored into the memory card 44 of the basic unit 3, the classification processing is performed by the extension unit 4a in response to an instruction from the basic unit 3. The basic unit 3 may detect that a predetermined amount of collected data has been saved into the memory card 44 and send an instruction to start classification to the extension unit. The start may be made by the extension unit detecting that an amount of data sufficient for learning (time-series data in a predetermined number of scan cycles) has been accumulated in a storage part such as a buffer memory or a memory card. The classification processing has already been described in detail with reference to FIGS. 13A and 13B and will thus not be described here.

Subsequently, in S32, the CPU 41a determines a parameter used at the time of identifying an abnormal device in accordance with the time-series data classified in S31 and ends the processing. The processing here is performed for each classified type, and the type of the device corresponding to the time-series data and the parameter are stored in association with each other. When there is an already determined parameter, the parameter may be updated to the parameter determined this time instead of the already determined parameter, or a new parameter may be calculated and updated using the already determined parameter and the parameter determined this time. Various methods, such as an average value, can be applied to the calculation method, and a method suitable for each time-series data is selected. The determined parameters may be made changeable by the operator. Thus, even when an extreme parameter is determined in the case of the learning period being short, it is possible to make an adjustment.

Here, the parameter determined in S32 will be described. For the 1201 and 1202 types in FIG. 12 (the devices in each of which the value changes in a steady pattern in synchronization with a predetermined cycle), for example, the CPU 41a calculates the time between arbitrary change points of the waveform for each operation cycle of the apparatus from the change pattern of the waveform within the operation cycle of the apparatus and determines the threshold of the time between the change points as a parameter on the basis of the distribution of the time between the change points. Further, the parameter in this case may include the timing at which the device value of the time-series data at the normal time changes.

The threshold of the time between the change points as the parameter described above may be determined, for example, by calculating a standard deviation and an average value from the variation at the time of learning, setting the average value+3×standard deviation as the upper limit threshold, and setting the average value−3×standard deviation as the lower limit threshold. For the 1203 type (the device taking a constant value), the CPU 41a uses the constant value as a parameter. As described above, for the device with its value changing in a steady pattern in synchronization with a predetermined cycle, a time interval between change points, the timing of change points, and a threshold related thereto are used as parameters.

For the 1205 type (analog value), for example, the value of the time-series data at the time of learning and a threshold relating to the distance from the time-series data at the time of learning may be used as parameters. The calculation method for the distance may be, for example, a method for obtaining the sum of the differences for the respective points. In this case, at the time of estimation, the distance between the time-series data at the time of learning and the time-series data at the time of estimation is calculated, and it is determined whether the distance is within the range of the threshold. For the 1206 type (monotonic increase, monotonic decrease), for example, an increased value at the time of monotonic increase and a decreased value at the time of monotonic decrease at the normal time are determined as parameters.

As described above, according to the present embodiment, each device is classified as one of a plurality of previously determined types on the basis of the periodicity characteristic of the time-series data of each device, and a detection algorithm of an abnormality (a change different from usual), which is appropriate for each classified type, is applied. That is, in the present embodiment, in the learning phase, the device is classified as one of a plurality of previously determined types from the time-series data at the normal time (learning time). Furthermore, a detection algorithm is determined according to each type, and an evaluation variable and a parameter corresponding to each detection algorithm are set. On the other hand, in the estimation phase, for each device with its detection algorithm determined in the learning phase, the detection algorithm determined according to the type of the determined estimation target device is applied to the time-series data of the device. Thus, the abnormal device is identified by analyzing the time-series data of the device by using the detection algorithm of the abnormal device corresponding to the type of the device determined in the learning phase or the type of the device. Note that a device that was not classified as a predetermined type at the time of learning is preferably not taken a device as a collection target at the time of estimation because no evaluation variable or parameter has been set. In other words, the above is for preventing the following: even when such data is collected, since a detection algorithm for identifying whether or not the device is an abnormal device has not been set, the processing load and the consumption of memory resources increase unnecessarily.

<Estimation Phase>

FIG. 16 is a flowchart showing a processing procedure at the time of identifying an abnormal device. The processing described below is achieved by the CPU 31 of the basic unit 3 and the CPU 41a of the extension unit 4a. However, the present invention is not intended to be limited, and a part of the processing may be executed by the basic unit 3 or other units such as the extension units 4a, 4b or may be executed by the external apparatus (analyzer) communicatively connected to the programmable logic controller. Here, as a series of processing, the processing of acquiring a device value, saving the device value from the buffer memory to the memory card 44 when the saving condition is satisfied, and executing identification processing will be described as a series of processing. Accordingly, the processing of the basic unit 3 for acquiring the device value and storing the device value into the memory card 44 and the processing of the extension unit 4a for acquiring the device value saved into the memory card 44 by the basic unit 3 and executing the identification processing are shown as a series of processing. That is, the processing of saving the device value when the saving condition is satisfied (S41 to S46 below) is performed by the CPU 31 (collection part 52a) of the basic unit 3, and the processing of identifying an abnormality by using the device value saved in the memory card 44 (S47 and S48) is performed by the CPU 41a of the extension unit 4a. Naturally, the processing in S41 to S48 or a part thereof may be executed by other units.

Here, a saving condition for storing the device value saved in the buffer memory (first buffer 37a) of the basic unit 3 into the memory card 44 will be described. For example, the saving condition is a condition satisfied when an abnormality occurs in the PLC, when a device to be a saving trigger is designated in advance by the user and there is a predetermined change in the device value of the device, when an analysis command is issued by the user, when a monitoring cycle for periodic monitoring has elapsed, when an analysis command is issued from an extension unit connected to the basic unit 3, and the like. These saving conditions may be a condition set by the user, transferred and stored as project data, a condition input by the user during the operation of the PLC, a condition on the basis of information generated from the extension unit 4, or some other condition.

In S41, the CPU 31 determines whether or not a collection condition has been satisfied. The collection condition is a condition satisfied by, for example, the timing at which a previously determined collection cycle has elapsed or the timing of end processing of each scan.

In S42, the CPU 31 of the basic unit 3 acquires the device value collected in S4 of FIG. 11 and determines in S43 whether or not the acquired device value is the same as the device value previously saved into the first buffer 37a. When the device value is the same value, the processing returns to S41 in order to proceed to the processing of the next device value. On the other hand, when the device value is different from the previously stored device value, the processing proceeds to S44.

In S44, the CPU 31 stores the acquired device value into the first buffer 37a and then proceeds to S45. In this way, the collection part 52a acquires the device value (and time information) for each collection cycle (e.g., scan cycle) set by the collection setting 36a and stores the device value into the first buffer 37a. Note that a ring buffer is preferably adopted as the first buffer 37a. This is because not all data stored in the first buffer 37a are collected as log data (collected data) in consideration of memory resources.

In S45, the CPU 31 determines whether or not the saving condition for saving the device value, stored in the first buffer 37a, into the memory card 44 of the basic unit 3 has been satisfied. The saving condition here is set so as to be satisfied, for example, at the time of abnormality when an abnormality occurs during the operation of the programmable logic controller. As described above, the saving condition may be set to be satisfied at the time in addition to the time of abnormality of the PLC, and the processing of identifying whether or not the device value is abnormal may be executed. That is, a "device value abnormality" does not necessarily indicate an abnormality of the PLC, but may simply indicate a value different from the usual device value. Therefore, in addition to the time of abnormality of the PLC, conceivable examples in which the saving condition is satisfied include: the timing at which a device value different from usual is generated; the timing at which a monitoring instruction from the user is received; and the designated timing for determining an abnormality after a monitoring instruction is received from the user and after a predetermined execution cycle has further elapsed or periodically. These details will be described later in second and third embodiments. Note that at least one of the functions described in the first to third embodiments can be provided.

When the saving condition is satisfied, in S46, the CPU 31 of the basic unit 3 acquires the time-series data to be estimated from the first buffer 37a of the basic unit 3 in order to identify an abnormal device, and saves the time-series data into the memory card 44. The data to be estimated is, by default, pieces of data of all the devices, and may be selected according to the operator's designation or may be selected according to the type of abnormality. The time-series data may include time-series data for a period from the point before a predetermined period at the time of occurrence of an abnormality to the point after the lapse of the predetermined period at the time of occurrence of an abnormality. Alternatively, the data may be data within a predetermined period after the occurrence of an abnormality.

Next, in S47, the CPU 41a of the extension unit 4a identifies an abnormal device by using a detection method optimum for each type and the evaluation variable and parameter corresponding to the detection method on the basis of the type of the device corresponding to the time-series data determined at the time of learning, for each piece of time-series data saved into the memory card 44 in S46. As described above, according to the present embodiment, characteristics of changes in device values are extracted at the time of learning, each device value is classified as a previously determined type, and a detection method for an abnormality (a change different from usual), which is appropriate to each type of classified device, is applied. That is, in the present embodiment, in the learning phase, the device values are classified from the time-series data at the normal time, the detection method is determined according to each type, and an evaluation variable and a parameter corresponding to each detection method are set. On the other hand, in S47 above of the estimation phase, an abnormality is identified by applying an evaluation variable and a parameter, which are detection algorithms determined according to the type of each device classified in the learning phase, to the time-series data of the device and analyzing the evaluation variable and parameter. For the type of the time-series data, as described above, at the time of classification, the flag information of the type and the discrimination information of the device corresponding to the time-series data are stored in association with each other. Therefore, in S47, the CPU 41a discriminates the corresponding type from the discrimination information of the device that is the acquisition destination of the time-series data to be estimated and identifies an abnormal device by using the evaluation variable and the parameter that are the detection algorithms corresponding to the type. The determination method is performed by the method described above according to each parameter.

Figure 17:
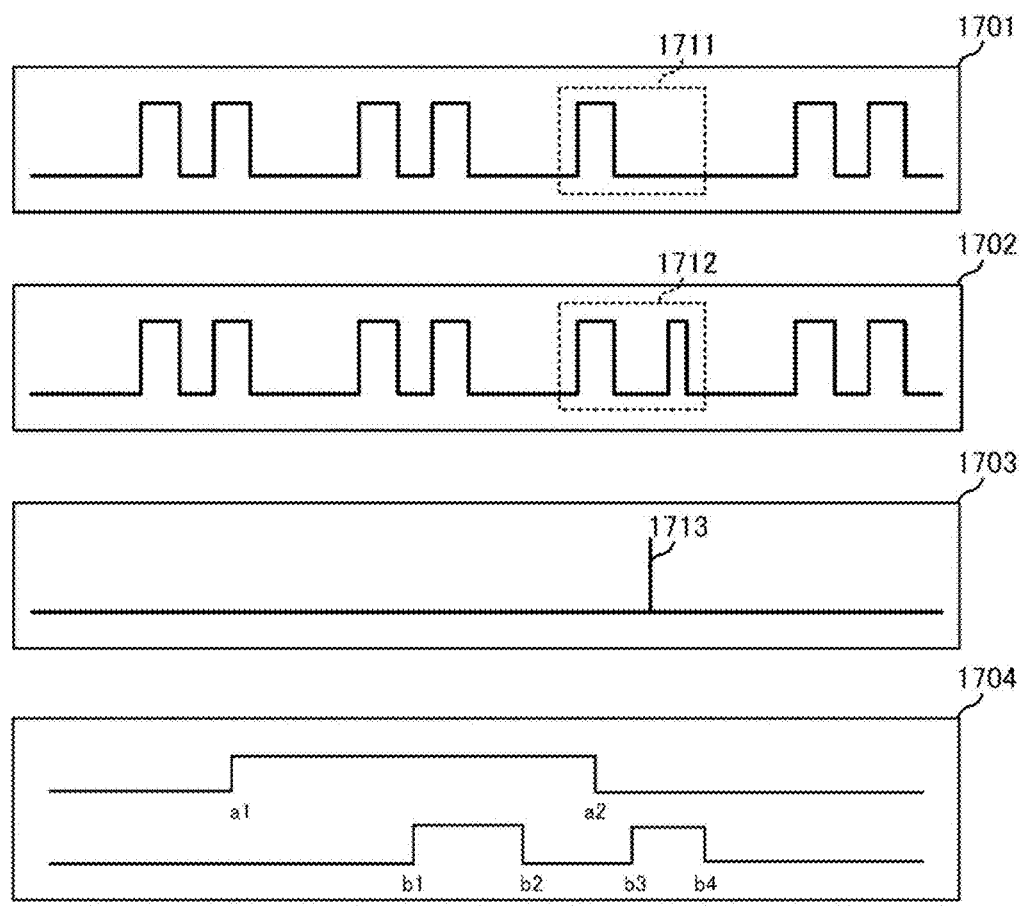
FIG. 17 is a diagram for explaining a method for determining an abnormality.

Here, with reference to FIG. 17, a determination method at the time of identifying an abnormal device will be described. Reference numerals 1701 and 1702 denote pieces of data of the abnormal devices of the 1201 and 1202 types (the devices with values changing in a steady pattern in synchronization with a predetermined cycle). Reference numerals 1711 and 1712 denote abnormal portions. As described above, when there is a device in which such a case has occurred where a signal to be changed does not change, a change point is shifted, or a pulse width is different as compared to at the normal time, the device can be identified as an abnormal device. The CPU 41a can discriminate the different data from the change at the normal time by using the determined detection algorithm. Reference numeral 1703 denotes the data of the abnormal device in the 1203 type (the device taking a constant value). As shown in 1713, the signal which should take a constant value has been changed, so that the device can be identified as an abnormal device.

Reference numeral 1704 denotes an algorithm for identifying an abnormal device by using pieces of time-series data of two devices classified as the same type, such as the 1201 and 1202 types (the devices with values changing in a steady pattern in synchronization with a predetermined cycle). In the algorithm, the time interval between the change points of the respective values of the two devices is checked in the device in which the change is made in synchronization with a predetermined cycle. For example, it is assumed that one device has two change points (a1, a2) in one cycle and the other device has four change points (b1, b2, b3, b4) in on cycle. In this case, it may be determined whether or not the time difference between each change point is a value within a threshold. More specifically, the time difference between the change point a1 and each of the change points b1 to b4 and the time difference between the change point a2 and each of the change points b1 to b4 may be determined with each threshold to determine whether or not the device is an abnormal device. The parameters in this case are the threshold of the time difference between the change points, the timing of each change point, and the threshold of the timing of each change point. When an abnormal device is identified using this determination method, two devices are identified as abnormal devices.

The description returns to FIG. 16. Next, in S49, the CPU 41*a* outputs the identification result of S48 and ends the processing. Here, the generation part 74 first generates display data for displaying the identification result, and the display data is displayed on the display part 5 of the basic unit 3 or transmitted to an external apparatus and displayed on the display part thereof. Here, a display screen based on the display data will be described later with reference to FIG. 18.

Figure 18:
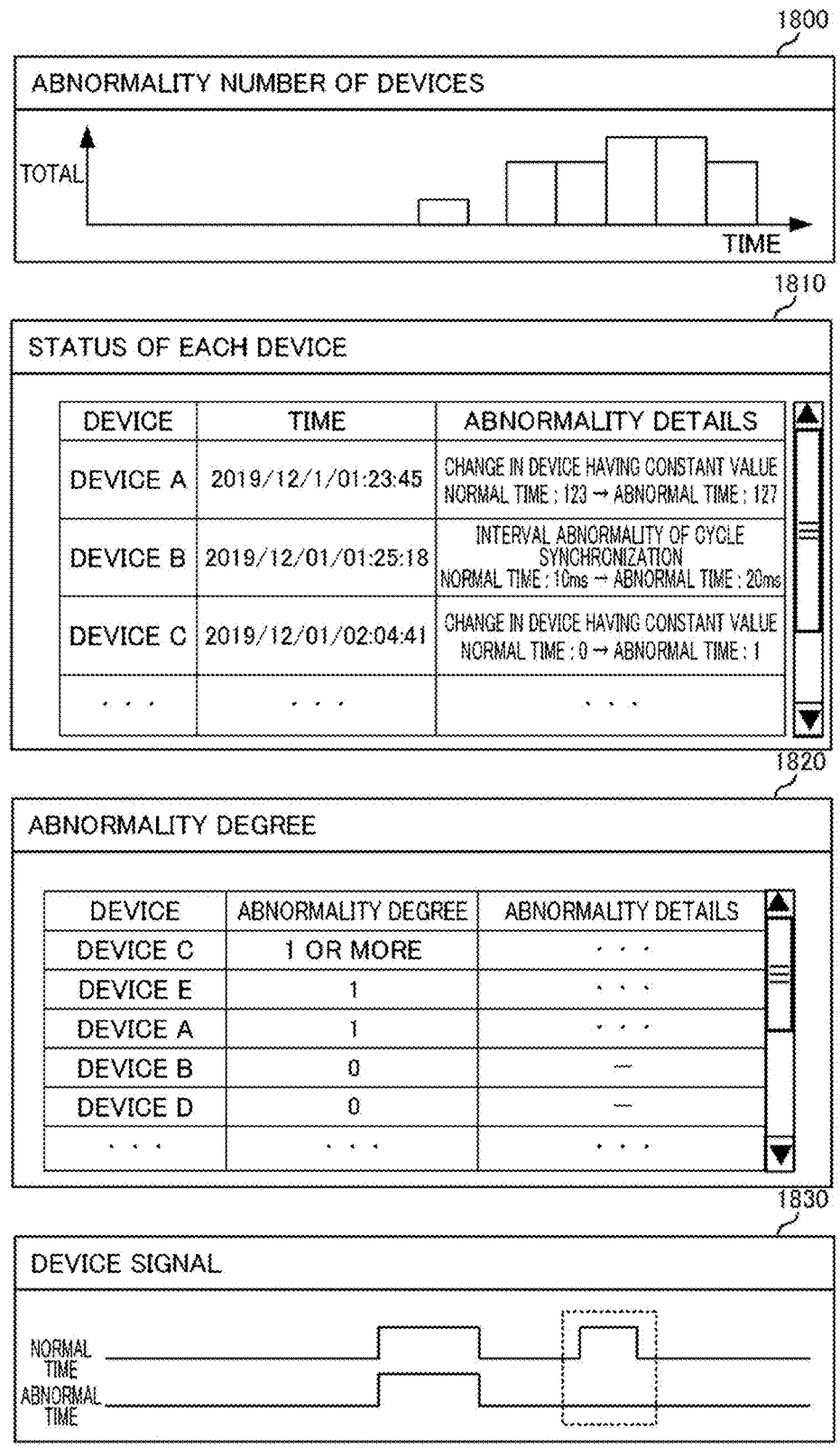
FIG. 18 is a diagram showing a display example of an identification result.

FIG. 18 shows a display example of the identification result.

A screen 1800 shows time on the horizontal axis and the number of abnormal devices on the vertical axis. The generation part 74 generates display data of the screen 1800 from a device identified as an abnormal device in accordance with the identification result and time-series data at that time. When an abnormality occurs in the programmable logic controller, facilities stop, and the number of abnormal devices tends to increase. Therefore, by displaying the accumulated number of occurrences of abnormal devices for each time interval of a predetermined period (e.g., every five minutes) as in the screen 1800, the operator can easily recognize from when the abnormality has occurred.

A screen 1810 is a display showing the status of each device identified as an abnormal device. The time when the abnormality occurred and the details of the abnormality are displayed for each device. Information that led to the determination of the abnormality is displayed as the details of the abnormality. For example, in a device A, it can be seen that in the device taking a constant value, the value at the normal time was 123, but the value changed to 127, whereby the device has been determined to be abnormal. In a device B, it is shown that an abnormal interval of change has occurred in a device in which a change is made in synchronization with a predetermined cycle.

A screen 1820 is a display showing the abnormality degree of the device as an estimation target. The generation part 74 generates display data for ranking and displaying the device abnormality degree for the estimated device from the identification result. That is, on the screen 1820, a candidate device having a high possibility of abnormality is displayed so as to be distinguishable by a device name or the like. For the display, in addition to the abnormality degree, the details of the abnormality and the classification of the device may be displayed. Here, the abnormality degree is determined, for example, by the number of abnormalities having occurred and the size of a difference from a predetermined threshold. That is, the abnormality degree indicates the size of the abnormality. On the screen 1820, an example of the display in descending order of the abnormality degree is shown, but sorting may be performed on conditions, such as the order of occurrence time, for display. In addition, the sorting may be performed in accordance with the classification method for the device, or only details of an abnormality related to a classification method selected in advance by the user may be displayed. For example, the abnormality degree may be obtained by the following equation using a predetermined threshold.

Abnormality degree=(current value−average value)/(threshold−average value), that is, the abnormal degree is defined as follows in accordance with the current value: When the current value exceeds the upper limit threshold, the abnormality degree is 1 or more. When the current value is equal to the upper limit threshold, the abnormality degree is 1. When the current value is equal to the average value, the abnormality degree is 0. When the current value is equal to the lower limit threshold, the abnormality degree is −1. When the current value is below the lower limit threshold, the abnormality degree is −1. For the abnormality degree, an absolute value may be taken. Further, when the current value is not equal to a predetermined value to be compared, the abnormality degree may be uniformly set to be 1.

A screen 1830 is an example in which the signals of the device at the normal time and the time of abnormality are displayed so as to be able to be compared. As shown in the screen 1830, it is desirable to highlight an abnormal portion. In the example of FIG. 18, the vicinity of a signal at the abnormal portion is displayed as surrounded by a dotted frame, but the signal at the abnormal portion may be displayed in color different from the other colors, or the portion may be blinked.

<Additional Learning>

Figure 21:
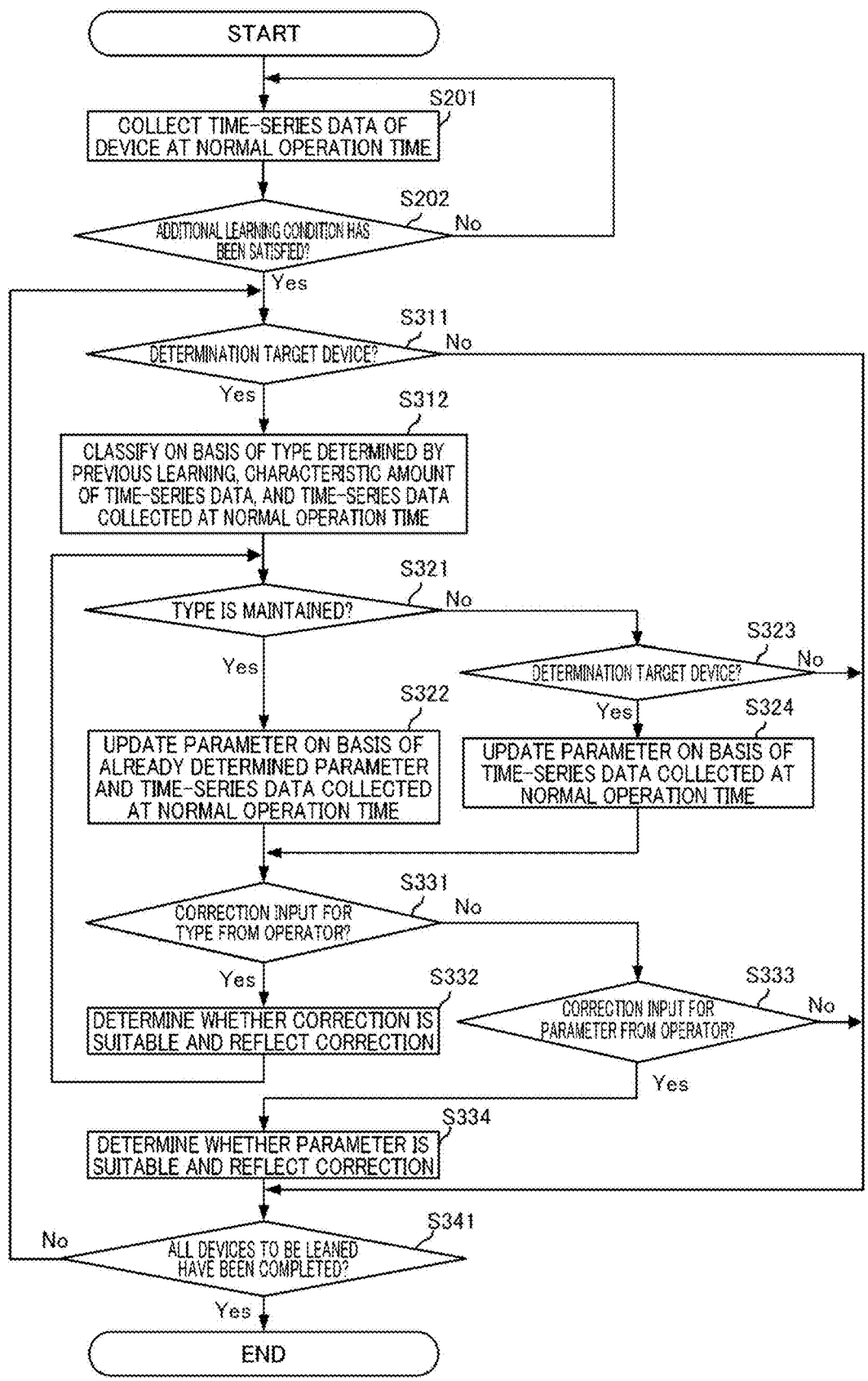
FIG. 21 is a flowchart showing a processing procedure of additional learning.

FIG. 21 is a flowchart showing a processing procedure used at the time of performing additional learning. Here, the additional learning is learning processing performed additionally at the timing different from the learning in the learning phase described with reference to FIG. 15. Various timings are assumed for the timing but may be, as described later, a case where a predetermined device is identified as abnormal in the estimation phase in spite of being normal, the timing designated by an operator, a periodic timing for coping with a change in the system over time, and the like. That is, the additional learning is learning performed additionally at the timing when it is necessary to update a learning model, such as a parameter for identifying an abnormal device determined in S32. The processing described below is achieved by the CPU 41*a* of the extension unit 4*a*. However, the present invention is not intended to be limited, and a part of the processing may be executed by the basic unit 3 or another extension unit 4*b* or may be executed by the external apparatus (analyzer) communicatively connected to the programmable logic controller.

In S201, the CPU 41*a* (collection part 52*c*) collects the time-series data of the device as the collection target when the apparatus is operating normally in accordance with the set collection setting. The devices as the collection targets include a plurality of devices as determination targets in the estimation phase. In addition, a device that is not the determination target in the estimation phase may be excluded from the devices as the collection targets. For example, a device classified as the device (1204) that operates irregularly may be excluded from the devices as the collection targets.

Here, the time-series data of the device as the collection target when the apparatus is operating normally is the time-series data of the device which is determined to be abnormal even though the determination result in the estimation phase should be determined to be normal. For example, when the learning is insufficient in the learning phase, the determination result in the estimation phase can be abnormal. Therefore, the CPU 41a may perform additional learning when the determination result of the time-series data to be collected becomes abnormal in spite of the normal operation of the apparatus. Even when the determination result in the estimation phase is abnormal and the time-series data at the time of occurrence of an abnormality (a state different from usual) is collected, in a case where the time-series data includes the time-series data corresponding to the period of the normal operation, such time-series data corresponding to the period of the normal operation also corresponds to the time-series data of the device to be the collection target at the time of normal operation of the apparatus. At this time, when the determination result for the time-series data corresponding to the period of the normal operation is abnormal, additional learning may be performed using that portion.

Next, in S202, the CPU 41a determines whether or not the additional learning condition has been satisfied, that is, whether or not the timing of the additional learning has arrived. The timing for starting the additional learning is, for example, the timing at which a predetermined period has elapsed from the previous learning processing, the timing at which a predetermined amount of time-series data has been collected, or the timing at which an instruction from the operator is received. Further, the timing for starting the additional learning may be a predetermined timing at which it is estimated that the apparatus is operating normally in the estimation phase, or at the timing when it is estimated that the apparatus is operating abnormally in the estimation phase. There are cases where it may be effective to update (perform additional learning) after a period of time instead of one-time learning to increase accuracy, such as a case where the operation of an apparatus is sometimes slow, but the slowness of the operation is within a normal range, or a case where the operation time changes due to a change in air pressure when the power of the apparatus is turned on again (change over time).

In S311, the CPU 41a determines whether or not each of the plurality of devices set as the collection targets is the determination target in the estimation phase. When the CPU 41a determines that the device is the determination target, the processing proceeds to step S312 for performing additional learning for the device, and when determining that the device is not the determination target, the processing proceeds to step S341 without performing additional learning for the device. For example, the CPU 41a determines that the device classified as the device (1204) that operates irregularly is not the determination target and proceeds to step S341 without performing additional learning.

In S312, the CPU 41a executes the classification processing. For example, when a predetermined amount of collected data is stored into the memory card 44 of the basic unit 3 after the power is turned on again, the classification processing is performed by the extension unit 4a in response to an instruction from the basic unit 3. The stored predetermined amount of collected data is the time-series data of each device collected in the target period of the additional learning. The basic unit 3 may detect that a predetermined amount of collected data has been saved into the memory card 44 and send an instruction to start classification to the extension unit. After the power supply is turned on again, the start may be made by the extension unit 4a detecting that an amount of data sufficient for learning (time-series data in a predetermined number of scan cycles) has been accumulated in a storage part such as the buffer memory (first buffer 37a) or the memory card 44.

Specifically, in S312, the CPU 41a automatically classifies the device to be classified on the basis of the type determined up to the previous time, the characteristic amount of the time-series data for the device, and the time-series data to be classified, collected this time. For example, the CPU 41a is classified as the device (1203) type taking a constant value by the previous learning, and when the time-series data at the time of normal operation collected this time for the device includes a value different from the constant value, the classification is updated to the device (1204) that operates irregularly. Here, the characteristic amount of the device (1203) taking a constant value corresponds to the constant value. Similarly, when the device has been classified in the device (1201) that operates in synchronization with the operation cycle of the apparatus by the previous learning and the time-series data at the time of normal operation collected this time for the device includes a pattern different from that in the previous learning, the CPU 41a updates the classification to the device (1204) that operates irregularly. Here, the characteristic amount of the device (1201) that operates in synchronization with the operation cycle of the apparatus corresponds to the change pattern of the waveform within the operation cycle of the apparatus, that is, the change pattern of the time-series data. With the classification being updated, the detection algorithm determined according to the updated type is also updated. Further, the corresponding parameters are also updated according to the updated detection algorithm in S324 and S334 to be described later.

Note that the CPU 41a automatically classifies the devices to be classified on the basis of the time-series data to be classified, but in addition to this, the CPU 41a may receive the setting of the type for the device to be classified. Of the devices to be classified, many devices need not be changed in type, and even for the type requiring a change, the operator may be aware of which device should be changed to which type. Therefore, the CPU 41a receives the setting of the type for the device to be classified according to the operator's designation and stores flag information indicating the classified type in association with discrimination information indicating the device to be classified. Alternatively, the device may be classified as the device (1204) that operates irregularly according to the operator's designation and may be excluded from the determination target in the estimation phase. The setting of the type for the device to be classified may be performed before the classification by the CPU 41a. For example, when the setting of the type is performed on a specific device of a plurality of devices to be classified on the basis of the operator's designation, the CPU 41a does not perform the classification based on the time-series data to be classified on the device to which the type has been set previously. On the other hand, the CPU 41a performs classification based on the time-series data to be classified for the other device different from the specific device among the plurality of devices to be classified. In particular, in a case where the type of the device has been determined by the previous learning, and additional learning is further performed, the type of the device may be fixed by the previous learning on the basis of the operator's designation, and the type of the device different from the type of the device may be determined by the previous learning on the basis of the operator's designation for the device requiring change. For example, a type not used at the time of identifying an abnormal device may be determined.

In S321, the CPU 41a determines whether or not the type of the device determined by the previous learning is maintained in the reclassification in S312. When the CPU 41a determines that the type of the device determined by the previous learning is maintained, the processing proceeds to S322 to determine the parameter. On the other hand, when it is determined that the type of the device determined by the previous learning is not maintained, that is, when it is determined that the type of the device has been reclassified and updated, the processing proceeds to S323, and the CPU 41a determines whether or not the device is the determination target in the estimation phase on the basis of the update result of the classification processing. When the CPU 41a determines that the device is the determination target, the processing proceeds to S324 for determining a parameter for the device, and when the CPU 41a determines that the device is not the determination target, the processing proceeds to S341. For example, the CPU 41a determines that the device classified as the device (1204) that operates irregularly is not the determination target and suspends the additional learning, and the processing proceeds to step S341.

In S322, the CPU 41a calculates and updates a new parameter by using the parameter already determined for the target device and the time-series data at the time of normal operation collected this time for the target device, and the processing proceeds to S331. For example, when the device (1201) that operates in synchronization with the operation cycle of the apparatus is determined by the previous learning and the type of the device is maintained, the CPU 41a calculates and updates a new upper limit threshold and a new lower limit threshold on the basis of the upper limit threshold and lower limit threshold indicating the time variation between arbitrary change points of the time-series data determined by the previous learning and the time-series data at the time of normal operation collected this time. Thus, a new upper limit threshold and a new lower limit threshold are calculated and updated on the basis of the time between arbitrary change points of the time-series data at the time of normal operation collected this time and the upper limit threshold and the lower limit threshold, so that the width of the updated threshold is widened or narrowed according to the variation in time between arbitrary change points of the time-series data at the time of normal operation collected this time and the degree of deviation from the threshold.

In S324, the CPU 41a calculates and updates the parameter corresponding to the type after the update by using the time-series data at the time of normal operation collected this time, and the processing proceeds to S331. The parameter calculated and determined here may be obtained by the same calculation method for the parameter determined in S32 of FIG. 15. For example, various methods, such as an average value, can be applied to the calculation method, and a method suitable for each time-series data is selected. The determined parameters may be made changeable by the operator. Thus, even when an extreme parameter is determined in the case of the learning period being short, it is possible to make an adjustment.

In S331, the CPU 41a determines whether or not a correction input for classification has been received from the operator for each device. For example, the CPU 41a can accept the setting of the type for the device to be classified and correct the classified type according to the operator's designation, and the CPU 41a determines whether or not the classification has been corrected based on such a correction input from the operator. When the CPU 41a determines that a correction input for the classification for each device has not been received from the operator, the processing proceeds to S333.

On the other hand, when it is determined that a correction input for the classification is received from the operator, the processing proceeds to S332, and the CPU 41a determines whether or not the correction is appropriate for the type of the set device to be classified according to the operator's designation, and when determining that the correction is appropriate, the CPU 41a reflects the correction to the type of the classification set according to the operator's designation. That is, the CPU 41a determines whether or not the time-series data at the time of normal operation collected this time is suitable for the set type of the classification. Further, when determining that the type of the classification set according to the operator's designation is not suitable, the CPU 41a may notify that the type is not suitable or may urge the re-designation of the classification while notifying that the type is not suitable. For example, when the device has been classified as the device (1203) type taking a constant value according to the operator's designation and the time-series data at the time of normal operation collected this time includes a value different from the constant value, the CPU 41a may notify that the type having been set by the operator is not suitable or may reclassify the device as the device (1204) that operates irregularly. Similarly, when the device has been classified as the device (1201) that operates in synchronization with the operation cycle of the apparatus according to the operator's designation and the time-series data at the time of normal operation collected this time includes a different pattern, the CPU 41a may notify that the type having been set by the operator is not suitable or may reclassify the device as the device (1204) that operates irregularly. When the processing of S332 ends, the CPU 41a returns the processing to S321 again in order to determine a parameter in accordance with the corrected classification.

In S333, the CPU 41a determines whether or not the operator has input a parameter correction for each device. For example, the CPU 41a may further adjust the parameters updated in S322 or S324 according to the operator's correction input. When it is determined that the correction instruction for the parameter by the operator has not been received, the processing proceeds to S341. On the other hand, when the operator has made a correction instruction for the parameter, the CPU 41a determines in S334 whether or not the time-series data at the time of normal operation collected this time is suitable for the set parameter for the device to be classified according to the operator's designation. When determining the data as suitable, the CPU 41a reflects the correction to the parameter set according to the operator's designation. When determining that the correction of the parameter set according to the operator's designation is not suitable, the CPU 41a may notify that the correction is not suitable or may urge the re-designation of the parameter while notifying that the correction is not suitable. Note that the CPU 41a may calculate the parameter by a similar calculation method to that in S32.

Subsequently, In S341, the CPU 41a determines whether or not the additional learning processing has been completed for all the devices to be learned. When the additional learning processing is not completed for one of the devices to be learned, the CPU 41a returns the processing to S311 to perform the additional learning processing for the uncompleted devices. On the other hand, when the additional learning processing is completed for all the devices to be learned, the CPU 41*a* ends the additional learning processing.

<Modification>

The present invention is not limited to the above-described embodiment, and various modifications are possible. For example, in the above embodiment, the examples of analyzing and classifying the pieces of collected data of the bit devices and the word devices have been described, but the present invention is not limited only to such device values. For example, the collected data is not limited to the example described in the above embodiment but may be information such as a camera image or an event log.

Figure 19:
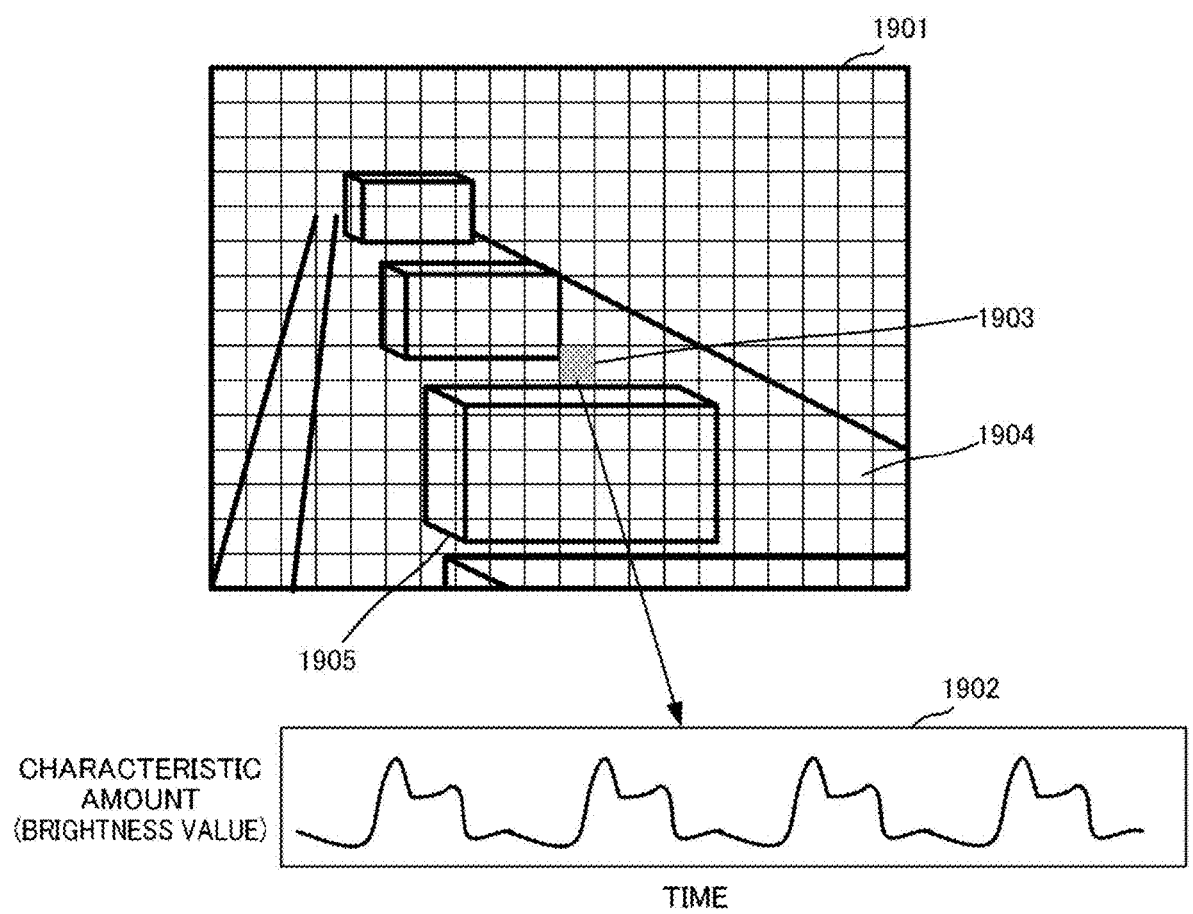
FIG. 19 is a diagram showing a modification of collected data.

FIG. 19 shows a modification of the collected data. Here, a case where the collected data is a camera image (moving image) will be described. Reference numeral 1901 denotes a camera image to be collected. This is a captured image of a predetermined location in a factory facility. For example, the CPU 41*a* may divide these camera images 1901 into a plurality of areas and determine the parameter by using a brightness value in each of the areas as a characteristic amount. The camera image 1901 shows a state where a belt conveyor 1904 conveys a plurality of product 1905 at equal intervals. In such a case, as shown in 1902, it is possible to determine whether or not the normal operation is performed using the fact that a brightness value in a predetermined area 1903 changes with time. For example, in a shaded portion of the camera image 1901, since the product passes through at predetermined time intervals, the image (brightness value) of the product interrupts periodically. By using such a change in brightness value, it is possible to confirm whether the product is flowing normally or whether the product is not skewed on a belt conveyor by monitoring a plurality of areas. In FIG. 19, the conveyance path of the product has been described as an example, but for example, when an image of a location where the robot is driving is captured, and an image of the arm portion periodically interrupts a predetermined image area in accordance with the operation of the robot arm, it is possible to check whether or not the robot is operating normally. Note that the camera image may be classified as the device taking an analog value.

Second Embodiment

A second embodiment of the present invention will be described below. In the first embodiment, the flow of the processing when the PLC basically shows an abnormality, that is, when the saving condition is the time of abnormality of the programmable logic controller, has been mainly described. However, as described above, the present invention is not limited to the identification function for identifying an abnormal device by using the occurrence of an abnormality in the PLC as a trigger, and can also be applied to the processing (analysis function) for analyzing a difference from time-series data at the normal time. Therefore, in the present embodiment, a description will be given of the processing of analyzing and verifying whether the collected device value is a value deviating from the time-series data at the normal time (device value different from usual). In the following description, only portions different from the first embodiment will be described.

In the present embodiment as well, characteristics of changes in device values are extracted and classified, and a detection algorithm for an abnormality (a change different from usual), which is appropriate to each of the classified characteristics, is applied. That is, in the present embodiment as well, similarly to the first embodiment, in the learning phase, the device values are classified from the time-series data at the normal time, the detection algorism is determined according to each type, and an evaluation variable and a parameter corresponding to each detection algorithm are set. In the present embodiment as well, these learning phases are performed in advance before the estimation phase is executed, and flag information indicating the classified type and discrimination information of the device corresponding to the time-series data are stored. In the estimation phase, a detection algorithm determined according to the type of the time-series data to be estimated is applied to analyze and verify whether the device value is different from usual. That is, the classification processing is not performed again in the estimation phase. In this case, it is possible to avoid failure to processing the classification processing or unintended updating of the learning data in operation. Note that the classification processing may also be performed in the estimation phase. In this case, it is also possible to extract time-series data that can be regarded as normal out of the newly obtained time-series data on the basis of the already learned data at the normal time, and update the learning data in response to a change over time on the basis of the newly extracted time-series data and the already learned time-series data. For example, for a device with its value changing in a steady pattern in synchronization with a predetermined cycle, the threshold included in the parameter may be updated on the basis of the variation of the newly extracted time-series data and the time-series data that has already been learned.

With reference to FIG. 16, a description will be given of a processing procedure at the time of verifying whether or not the device value is different from the usual device value, that is, whether or not the device value deviates from the device value at the normal time. The processing described below is achieved by the CPU 31 of the basic unit 3 and the CPU 41*a* of the extension unit 4*a*. Note that only processing different from those in the first embodiment (S45) will be described, and the other processing will not be described.

In S45, the CPU 31 determines whether or not the saving condition for saving the device value, stored in the first buffer 37*a*, into the memory card 44 of the basic unit 3 has been satisfied. In the first embodiment, it has been described that the saving condition is satisfied when an abnormality occurs in the programmable logic controller. However, in the present embodiment, the control is performed so as to satisfy the saving condition when a device to be a saving trigger is designated in advance by the user and there is a predetermined change in the device, when an analysis command is issued by the user, when a monitoring cycle for periodic monitoring has elapsed, when an analysis command is issued from an extension unit connected to the basic unit 3, when the collected device value is different from usual, and the like. For example, when a device value different from the previous device value is generated in S43, it may be determined in S45 that the saving condition has been satisfied, and the processing may proceed to the identification processing. In addition, the saving condition may be controlled so as to be satisfied according to the difference (degree of divergence) from the previous device value or the number of device values different from that at the normal time. The analysis instruction from the user may instruct to analyze and verify a specific device in real time but may instruct to verify the past data of the specific device. In S47, an abnormal device is not identified, but the abnormal state deviating from the time-series data at the normal time is analyzed and verified.

Next, a display example of the analysis result according to the present embodiment will be described with reference to FIG. 18. Formally, the display is similar to the identification result of the first embodiment, but in the present embodiment, the abnormal device is not identified, but the state (abnormal state) in which the deviation from the time-series data at the normal time has occurred is identified, and the display content is changed accordingly.

Therefore, for example, a screen 1800 indicates not the number of abnormalities of devices but the number of times the deviation from the time-series data at the normal time occurs. The abnormality degree is preferably obtained not by using the number of times of occurrence of device abnormalities but by using the number of times of occurrence of the abnormal state in the present embodiment, that is, the number of times of occurrence of deviation from the time-series data at the normal time.

Third Embodiment

A third embodiment of the present invention will be described below. In the first and second embodiments, the identification function and the analysis function have been described. In the present embodiment, a monitoring function for periodically collecting and monitoring device values will be described. In the following description, only portions different from the first and second embodiments will be described.

Figure 20:
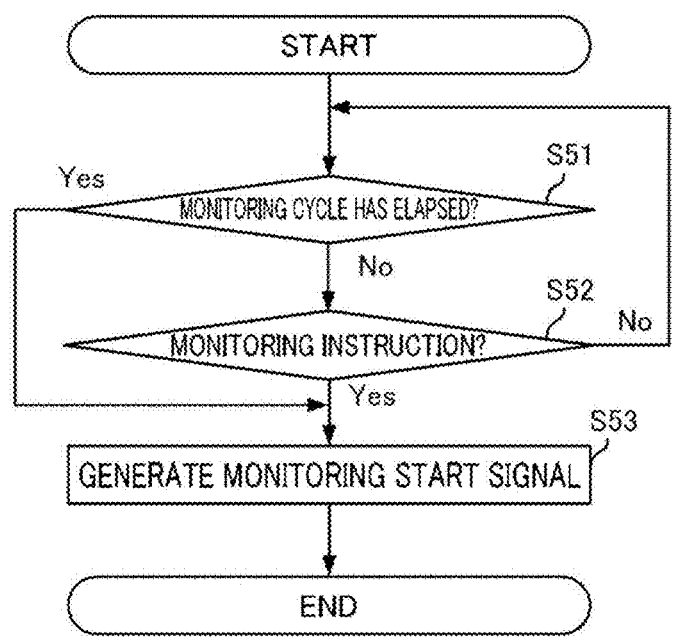
FIG. 20 is a flowchart showing a processing procedure for outputting a monitoring start signal.

FIG. 20 is a flowchart showing a processing procedure for outputting a monitoring start signal for starting monitoring according to the present embodiment. The processing described below are executed by the CPU 31 of the basic unit 3. However, the present invention is not intended to be limited and may be executed by the CPU 41a of the extension unit 4a.

In S51, the CPU 31 determines whether or not the monitoring cycle has elapsed. The monitoring cycle is a value that can be set by the operator (administrator) of the programmable logic controller, and an arbitrary period can be set. The set value is set in the collection setting 36a of the storage apparatus 32, for example. When the monitoring cycle has elapsed, the processing proceeds to S53; otherwise, the processing proceeds to S52.

In S52, the CPU 31 determines whether or not a monitoring instruction has been received from the user. The monitoring instruction can be received through a user input via the operation part 6 of the PC 2a or the basic unit 3. When the monitoring instruction from the user is received, the processing proceeds to S53; otherwise, the processing returns to S51.

In S53, the CPU 31 generates a monitoring start signal, outputs the monitoring start signal to the basic unit 3, and ends the processing. When receiving the monitoring start signal, the basic unit 3 determines in S46 of FIG. 16 that the saving condition has been satisfied, and executes the processing of S47 and thereafter to execute the analysis processing. Here, the saving condition in S46 is satisfied immediately after the reception of the monitoring start signal, and the time-series data saved in the memory card 44 from a predetermined period to the present is collected. The saving condition in S46 may be satisfied after a predetermined execution cycle has elapsed after the reception of the monitoring start signal, and the time-series data saved in the memory card 44 may be collected during a predetermined period after the reception of the monitoring start signal. Alternatively, the saving condition in S46 may be satisfied after a predetermined execution cycle has elapsed after the reception of the monitoring start signal, and the time-series data saved in the memory card 44 may be collected during a predetermined period before and after the reception of the monitoring start signal.

These monitored data can be selected by the user's setting. As in the second embodiment, in S48, an abnormal device is not identified, but the abnormal state deviating from the time-series data at the normal time is analyzed and verified. For the analysis result, a similar display to that in the second embodiment is output.

SUMMARY

As described above, the programmable logic controller according to the present embodiment includes an execution engine that repeatedly executes a user program and a device memory having a plurality of devices which are storage areas for storing data accessed by the execution engine in accordance with the user program. The programmable logic controller collects data held by a device as a collection target out of the plurality of devices in accordance with a predetermined collection setting for each scan cycle of the user program, classifies each of the devices into one of a plurality of types on the basis of a characteristic of the collected time-series data of each of the devices, and determines a detection algorithm used at the time of identifying the device as an abnormal device in accordance with the time-series data of the device collected by the collection section and the type of the device classified by the classification section for each of the devices. Further, the programmable logic controller identifies an abnormal device by analyzing the time-series data of the device collected by the collection section by using a detection algorithm determined by the determination section for the device in accordance with the type of the device classified by the classification section. As described above, according to the programmable logic controller of the present embodiment, it is possible to efficiently identify an abnormal device by analyzing and classifying characteristics such as periodicity and continuity of data related to each device.

The program controller further analyzes the deviation of the collected time-series data of each device from the time-series data at the normal time by using the determined detection algorithm according to the user instruction to verify whether or not an abnormality has occurred. Such an analysis function may be periodically performed in a predetermined cycle (monitoring function).

When pieces of time-series data of a predetermined number of scan cycles are accumulated, the programmable logic controller classifies each time-series data on the basis of the characteristics of the time-series data, and determines and updates a detection algorithm. As thus described, according to the present invention, the functions corresponding to the learning phase are periodically executed during the operation of the programmable logic controller, and the accuracy in the identification processing at the time of abnormality can be improved.

Further, in the programmable logic controller, in a group of one or more devices, when there is no change in the value collected in the previous scan cycle and the value collected in the current scan cycle in all the devices of the group as the collection target, the value collected in the current scan cycle is deleted, and the time-series data to be collected is compressed. Thus, memory resources can be effectively utilized.

The programmable logic controller classifies the plurality of devices into at least a device taking a constant value, a device with its value changing in a steady pattern in synchronization with the operation cycle of the apparatus, a device with its value changing in a steady pattern in synchronization with a different cycle of the operation cycle of the apparatus, a device with its value changing irregularly, a device with an analog value, and a device with its value increasing monotonically or decreasing monotonically. Further, by determining a detection algorithm based on the characteristic on the basis of the classifications, the abnormal device can be efficiently identified at the time of abnormality. It is not possible to extract the characteristic of the device with its value changing irregularly, and hence the device is not used for identifying an abnormality.

When identifying an abnormal device, the programmable logic controller compares the determined detection algorithm with a characteristic of time-series data corresponding to the detection algorithm and makes the identification as an abnormal device when a difference exceeds a predetermined threshold. Further, the programmable logic controller may determine a time difference between change points of respective values in two series of time-series data as a detection algorithm used at the time of identifying an abnormality, and identify the two devices corresponding to the two series of time-series data as abnormal devices when the time difference in the two series of time-series data is not within a predetermined range. As described above, according to the present invention, a detection algorithm is determined in accordance with each classified type, and at the time of abnormality, the abnormal device is identified by a method corresponding to each type by using the detection algorithm.

The programmable logic controller generates display data indicating an identification result and displays the display data on the display apparatus of the programmable logic controller or transmits the display data to the external apparatus. The identification result can be displayed on various display screens as the display screen (FIG. 18).

In the above embodiment, the example has been described where the extension unit 4a included in the programmable logic controller collects and classifies the time-series data, determines the detection algorithm in accordance with the classification, and identifies an abnormal device at the time of abnormality. However, the present invention is not limited thereto, and at least some of the functions described above may be achieved by the basic unit or another extension unit. Further, an analyzer (external apparatus) communicatively connected to the programmable logic controller may achieve the functions described above.

The invention is not limited to the above embodiments, and various modifications and changes are possible within the scope of the gist of the invention.

What is claimed is:

1. A programmable logic controller comprising:
   an execution engine that repeatedly executes a user program;
   a device memory having a plurality of devices that are storage areas for storing data accessed by the execution engine in accordance with the user program;
   a collection section for collecting data held by a device as a collection target out of the plurality of devices in accordance with a predetermined collection setting for each execution cycle of the user program;
   a classification section for classifying each of the devices into one of a plurality of types on a basis of a characteristic of time-series data of each of the devices collected by the collection section;
   a determination section for determining a detection algorithm used in identification of the device as an abnormal device in accordance with the time-series data of the device collected by the collection section and the type of the device classified by the classification section for each of the devices; and
   an identification section for identifying an abnormal device by analyzing the time-series data of the device collected by the collection section by using the detection algorithm determined by the determination section for the device in accordance with the type of the device classified by the classification section, wherein
   the type includes at least two types out of a type taking a constant value, a type in which a value changes in a steady pattern in synchronization with an operation cycle of the programmable logic controller, a device in which a value changes in a steady pattern in synchronization with a cycle different from the operation cycle, a type in which a value changes irregularly, a type with an analog value, and a type in which a value increases monotonically or decreases monotonically.

2. The programmable logic controller according to claim 1, wherein the identification section further identifies an abnormal device by analyzing a deviation between the time-series data of each of the devices collected by the collection section and time-series data at a normal time by using the detection algorithm determined by the determination section in accordance with a user instruction or periodically.

3. The programmable logic controller according to claim 1, wherein
   when the collection section accumulates series of time-series data of a predetermined number of scan cycles, the classification section classifies each of the series of time-series data on a basis of a characteristic of each of the series of time-series data, and
   the determination section determines and updates the detection algorithm used in identification of an abnormality in accordance with the series of time-series data classified by the classification section.

4. The programmable logic controller according to claim 1, wherein upon reception of a user instruction for an arbitrary device, the classification section classifies the device in accordance with the user instruction.

5. The programmable logic controller according to claim 1, wherein when a value collected in a previous scan cycle and a value collected in a current scan cycle in a group of one or more devices have not changed in all the devices of the group as a collection target, the collection section deletes the value collected in the current scan cycle and compresses the collected time-series data.

6. The programmable logic controller according to claim 1, wherein the determination section excludes time-series data classified by the classification section as the device in which a value changes irregularly, to determine a detection algorithm used in identification of an abnormality.

7. The programmable logic controller according to claim 1, wherein the identification section identifies an abnormal device by performing analysis, using an evaluation variable used for analysis of the abnormal device and a parameter corresponding to the evaluation variable on a basis of a type of the time-series data classified by the classification section as the detection algorithm.

8. The programmable logic controller according to claim 7, further comprising an additional learning determination section for determining whether a condition for additional learning has been satisfied, wherein when the additional learning determination section determines that the condition for additional learning has been satisfied, the classification section reclassifies each of the devices into one of a plurality of types on a basis of the type of each of the devices at present and a characteristic of time-series data of each of the devices collected by the collection section during a target period for additional learning, and the determination section redetermines the detection algorithm used in identification of the device as an abnormal device in accordance with the time-series data of the device collected by the collection section for each of the devices during the target period for additional learning and the type of the device reclassified by the classification section or the detection algorithm of each of the devices at present.

9. The programmable logic controller according to claim 1, wherein the identification section compares the detection algorithm determined by the determination section with a characteristic of time-series data corresponding to the detection algorithm and performs the identification as an abnormal device when a difference exceeds a predetermined threshold.

10. The programmable logic controller according to claim 1, wherein
the determination section determines a time difference between change points of respective values in two series of time-series data as a detection algorithm used in identification of an abnormality, and
the identification section identifies two devices corresponding to the two series of time-series data as abnormal devices when the time difference in the two series of time-series data is out of a predetermined range.

11. The programmable logic controller according to claim 1, further comprising an output section for outputting, as an identification result, a candidate device having a possibility of abnormality in a distinguishable manner.

12. The programmable logic controller according to claim 11, wherein the output section displays, as the identification result, each of the devices on a display part in order of an abnormality degree indicating a size of the abnormality or in order of an occurrence time of the abnormality.

13. The programmable logic controller according to claim 11, wherein the output section displays, as the identification result, time-series data at a normal time of the device identified as an abnormal device and time-series data at a time of abnormality on the display part in a comparable manner.

14. The programmable logic controller according to claim 1, wherein the time-series data collected by the collection section includes image data.

15. The programmable logic controller according to claim 1, wherein a characteristic of the time-series data is a characteristic related to periodicity or continuity.

16. The programmable logic controller according to claim 1, further comprising:
a basic unit; and
an extension unit connected to the basic unit,
wherein the basic unit includes the execution engine, the device memory, and the collection section, and
the extension unit includes the classification section, the determination section, and the identification section.

17. The programmable logic controller according to claim 1, further comprising:
a setting section for setting a monitoring cycle of the device;

a generation section for generating a monitoring start signal that starts monitoring for each monitoring cycle set by the setting section; and
an analysis section for analyzing time-series data to be analyzed in accordance with the monitoring start signal generated by the generation section by using the time-series data to be analyzed and the detection algorithm determined by the determination section out of the devices collected by the collection section, and for outputting the analysis result to the display part.

18. The programmable logic controller according to claim 1, further comprising a memory card that temporarily holds the time-series data of the device collected by the collection section before the time-series data is used by the classification section and the identification section.

19. An analyzer communicatively connected to a programmable logic controller including
an execution engine that repeatedly executes a user program,
a device memory having a plurality of devices that are storage areas for storing data accessed by the execution engine in accordance with the user program, and
a collection section for collecting data held by a device as a collection target out of the plurality of devices in accordance with a predetermined collection setting for each scan cycle of the user program,
the analyzer comprising:
an acquisition section for acquiring time-series data of each of the devices collected by the collection section from the programmable logic controller;
a classification section for classifying each of the devices into one of a plurality of types on a basis of a characteristic of time-series data of each of the devices acquired by the collection section;
a determination section for determining a detection algorithm used in identification of the device as an abnormal device in accordance with the time-series data of the device collected by the collection section and the type of the device classified by the classification section for each of the devices;
an identification section for identifying an abnormal device by analyzing the time-series data of the device collected by the collection section by using the detection algorithm determined by the determination section for the device in accordance with the type of the device classified by the classification section; and
an output section for outputting a result of the identification by the identification section wherein
the type includes at least two types out of a type taking a constant value, a type in which a value changes in a steady pattern in synchronization with an operation cycle of the programmable logic controller, a device in which a value changes in a steady pattern in synchronization with a cycle different from the operation cycle, a type in which a value changes irregularly, a type with an analog value, and a type in which a value increases monotonically or decreases monotonically.

20. A programmable logic controller comprising:
an execution engine that repeatedly executes a user program;
a device memory having a plurality of devices that are storage areas for storing data accessed by the execution engine in accordance with the user program;
a collection section for collecting data held by a device as a collection target out of the plurality of devices in accordance with a predetermined collection setting for each execution cycle of the user program;

a classification section for classifying each of the devices into one of a plurality of types on a basis of a characteristic of time-series data of each of the devices collected by the collection section;

a determination section for determining a detection algorithm used in identification of the device as an abnormal device in accordance with the time-series data of the device collected by the collection section and the type of the device classified by the classification section for each of the devices; and an identification section for identifying an abnormal device by analyzing the time-series data of the device collected by the collection section by using the detection algorithm determined by the determination section for the device in accordance with the type of the device classified by the classification section, wherein the determination section determines a time difference between change points of respective values in two series of time-series data as a detection algorithm used in identification of an abnormality, and the identification section identifies two devices corresponding to the two series of time-series data as abnormal devices when the time difference in the two series of time-series data is out of a predetermined range.

* * * * *